United States Patent [19]

Shibusawa

[11] Patent Number: 4,696,563

[45] Date of Patent: Sep. 29, 1987

[54] SPLIT SCANNING COPIER

[75] Inventor: Mitsuo Shibusawa, Yokohama, Japan

[73] Assignee: Ricoh Company, Ltd., Tokyo, Japan

[21] Appl. No.: 803,718

[22] Filed: Dec. 2, 1985

[30] Foreign Application Priority Data

Dec. 3, 1984 [JP] Japan ................. 59-254166

[51] Int. Cl.⁴ ............................................. G03G 15/00
[52] U.S. Cl. ....................................... 355/8; 355/3 R;
355/3 SH; 355/14 R
[58] Field of Search ............... 355/3 SH, 8, 3 R, 14 R

[56] References Cited

U.S. PATENT DOCUMENTS 4,279,504 7/1981 Brown et al. ................. 355/3 SH X
4,609,281 9/1986 Miyai et al. ........................ 355/8 X Primary Examiner—A. C. Prescott Attorney, Agent, or Firm—Cooper, Dunham, Griffin & Moran

[57] ABSTRACT

A multi-mode copying apparatus includes a contact glass on which an original is placed facing downward, a scanning unit for scanning along the contact glass, a photosensitive drum, imaging unit for forming a copy image on the drum, at least one cassette for storing therein a quantity of copy sheets, a size detector for detecting the length of the copy sheets stored in the cassette, and a control system for controlling the operation of the apparatus in accordance with the length information detected by the size detector. In one mode of operation, the control system divides the original surface into two original surface sections, i.e., left and right half sections, based on the length information supplied from the size detector, and copies are produced from at least one of the left and right half sections using a home position of the scanning unit as a reference for each copying operation.

12 Claims, 31 Drawing Figures

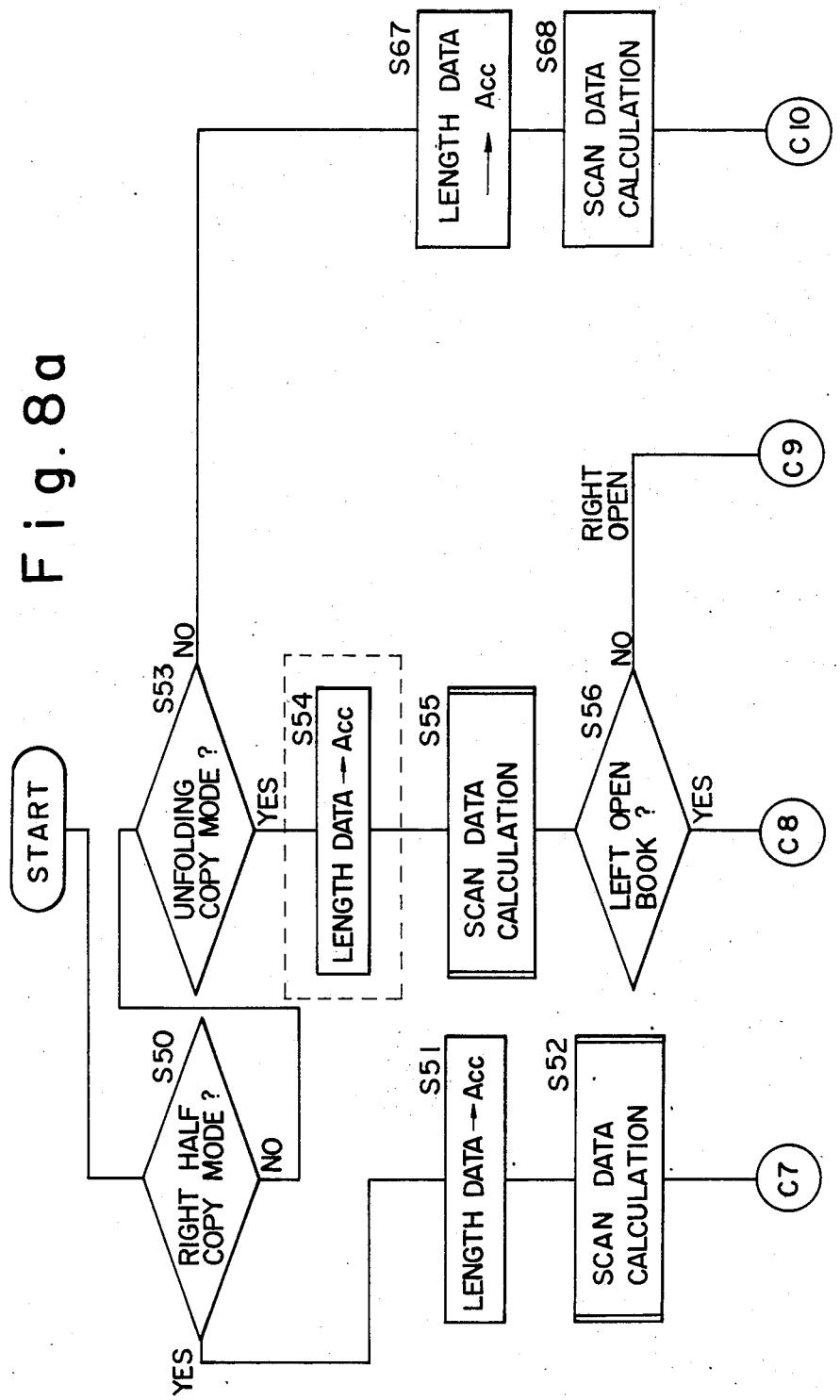

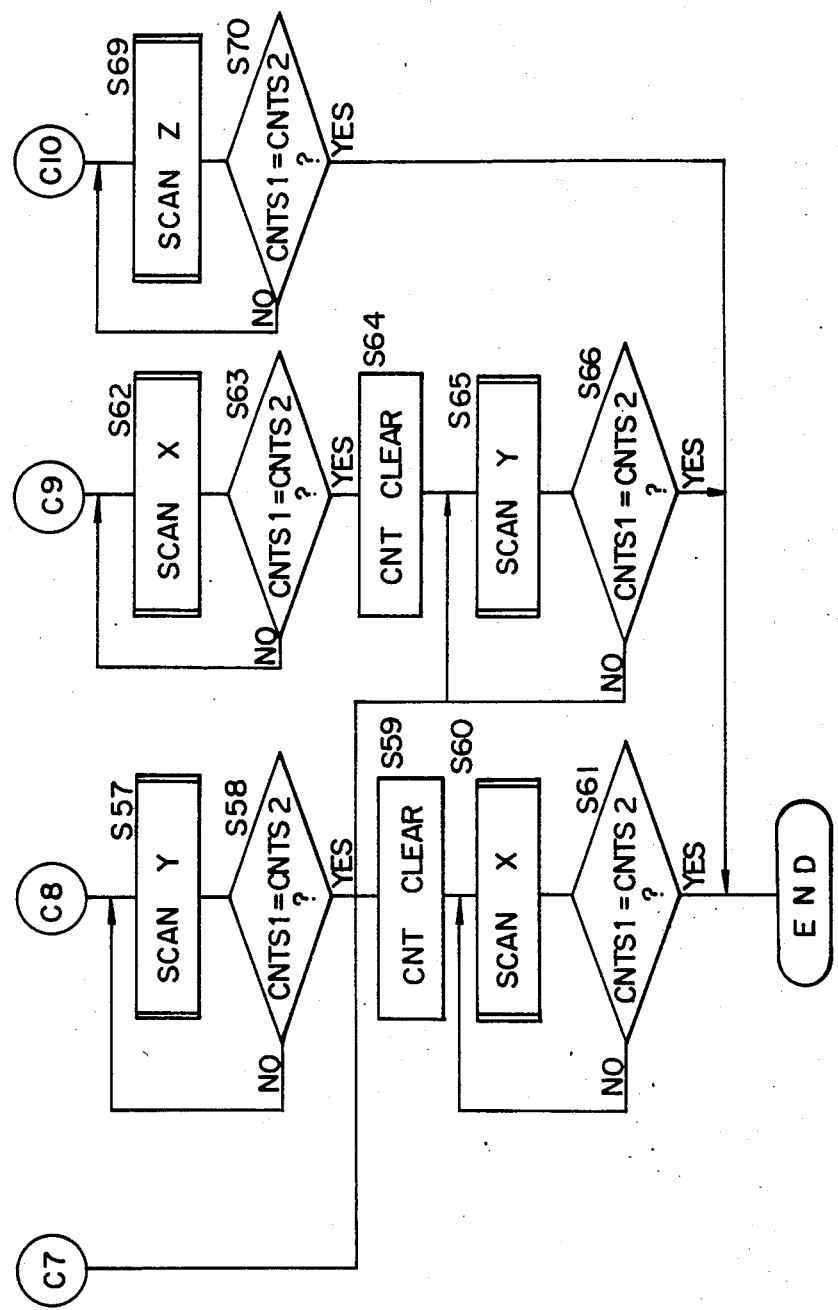

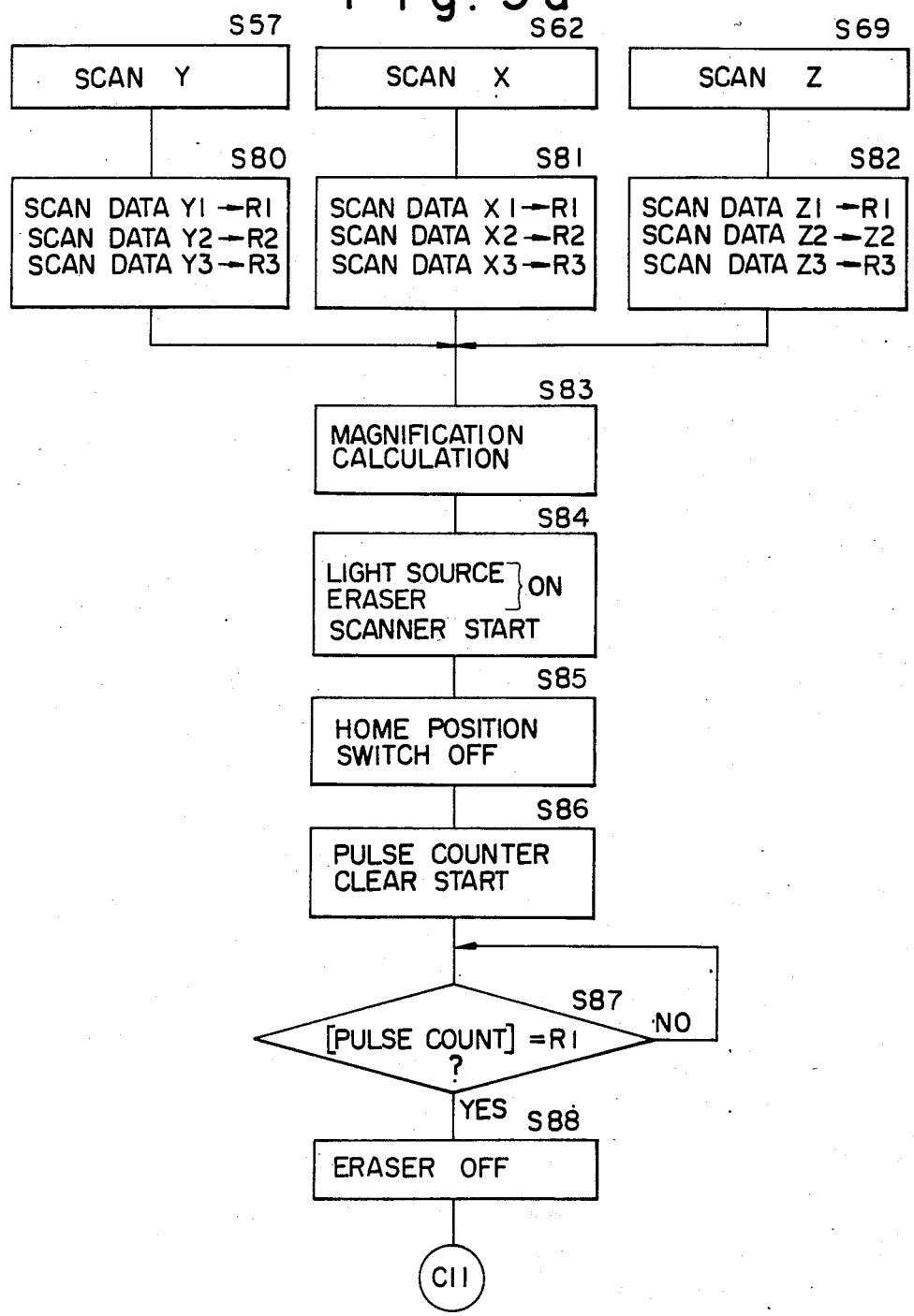

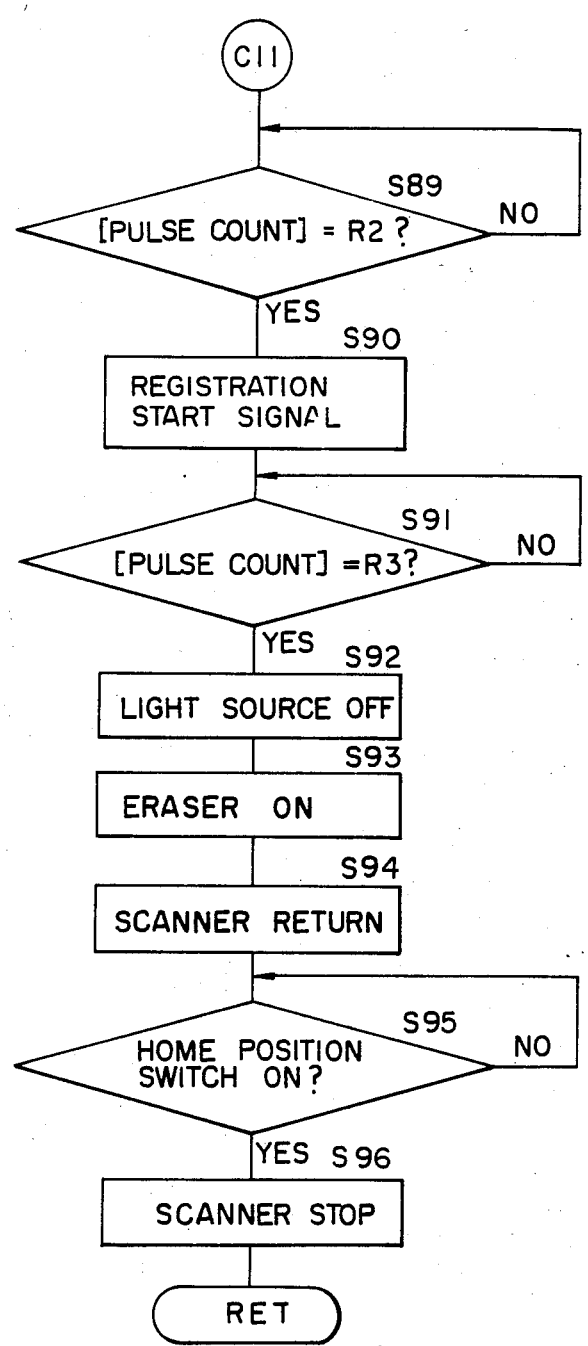

Fig. 10  Fig. 11
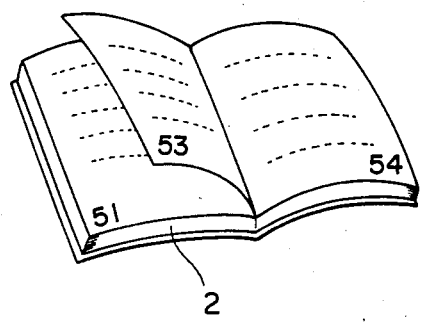
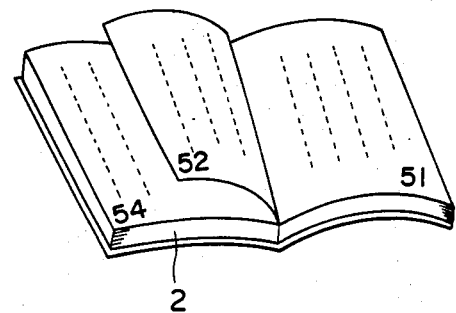
Fig. 12
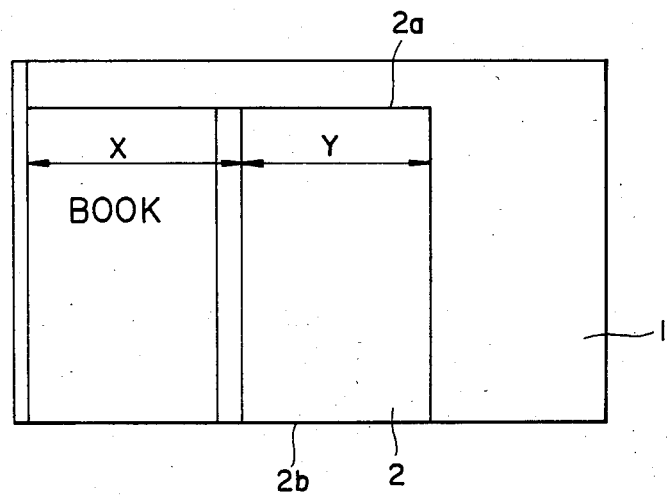

SPLIT SCANNING COPIER

BACKGROUND OF THE INVENTION

1. Field of the Invention

This invention generally relates to a copying apparatus, and, in particular, to a split scanning copying apparatus in which an original holding surface is split into two sections thereby allowing to reproduce original images in the split two sections on separate two copy surfaces, respectively. More specifically, the present invention relates to an electrophotographic copying apparatus having multiple modes of operation one of which is a split scanning mode in which two original images placed on an original holding surface are reproduced on two separate copy surfaces, such as front and rear surfaces of a copy sheet or two separate copy sheets.

2. Description of the Prior Art

A prior art copying apparatus for making two copies from two original images located at an original holding surface will first be described with reference to FIG. 1a. In such a prior art copying apparatus, an original document 2 is placed on a contact glass, which serves as an original holder, and a light source 3 is located below the contact glass 1. During a copying operation, with the surface of the original document 2 being divided into a first original surface section X and a second original surface section Y, the light source 3 is first caused to scan from a first reference position (home position) indicated by the solid line to a second reference position indicated by the one-dotted line in the direction indicated by the arrow S thereby illuminating the first original surface section X, and, then, the light source 3 is caused to move in the same direction from the second reference position to a terminal end position indicated by the two-dotted line thereby illuminating the second original surface section Y, whereby the original images at the respective first and second original surface sections X and Y are reproduced on separate copy surfaces. In this case, a boundary position Q between the first and second original surface sections X and Y varies depending on the length Z of the original document 2 so that the second reference position, where the light source 3 initiates its illumination of the second original surface section Y, varies according to the size of length Z. For this reason, according to the prior art, there is provided a detector (not shown) for detecting the boundary position Q, and this detector is manually moved to the boundary position Q for each original document 2 placed on the contact glass 1 so that the boundary position Q or second reference position for the light source 3 is set for a particular original document 2 from which copies are to be made. However, it is not only cumbersome to set the detector at a right position by moving it manually for each original document, but also difficult to establish the second reference position by moving the detector to be properly located at the boundary position Q.

Such a prior art copying apparatus can also be used in other modes of copying operation than the split scanning mode as described above. For example, it can be used to make a copy from one page of a book type original or from a half of a sheet type original. In such a case, an original is required to be placed on the contact glass 1 in an awkward fashion depending on the position of an original image to be copied. For example, as shown in FIG. 1b, in the case where the right-hand page of a book type original located to the right of a vertical reference plate 85 for determining the position of an original is to be copied, the original 2 must be placed on the contact glass 1 either covering the reference plate 85 as shown in FIG. 1b or being rotated with its top at bottom. In the former case, since the original 2 partly sticks out of the contact glass 1, the apparatus itself must be made larger in size and attention must be paid so as not to impair the projecting portion of the original. In the latter case, it is cumbersome to manually rotate the original top-side bottom so as to set it in position, and, moreover, when making copies of successive pages, since the book original must be rotated top-side bottom each time after making one copy, there is a chance that one or more pages are copied without rotating the book original appropriately, in which case it will be more cumbersome because all of the copies must be checked one by one as to their orientation.

SUMMARY OF THE INVENTION

It is therefore a primary object of the present invention to obviate the disadvantages of the prior art as described above and to provide an improved copying apparatus.

Another object of the present invention is to provide an improved split scanning copying apparatus reliable and efficient in operation.

A further object of the present invention is to provide an improved electrophotographic copying apparatus having multiple modes of operation, wherein one copy can be made from one original image on an original holder or two copies can be made on both sides of a copy sheet or on two separate sheets from two original images on the original holder.

A still further object of the present invention is to provide an improved copying apparatus having a split scanning mode of operation in which splitting of an original holding surface on which one or more originals may be placed is automatically carried out depending on the size of a copy sheet to be used.

Other objects, advantages and novel features of the present invention will become apparent from the following detailed description of the invention when considered in conjunction with the accompanying drawings.

BRIEF DESCRIPTION OF THE DRAWINGS

FIGS. 8a and 8b and 9a and 9b, when combined, respectively, show a flow chart with respect to the control of an optical system in the copying apparatus illustrated in FIG. 2;

FIG. 10 is a perspective view showing an open-to-left type book whose page number consecutively increases from left to right;

FIG. 11 is a perspective view showing an open-to-right type book whose page number consecutively increases from right to left;

FIG. 12. is an illustration showing how a book type original is placed on the contact glass 1 for making copies of its pages in contact with the glass 1;

DESCRIPTION OF THE PREFERRED EMBODIMENTS

Figure 22:
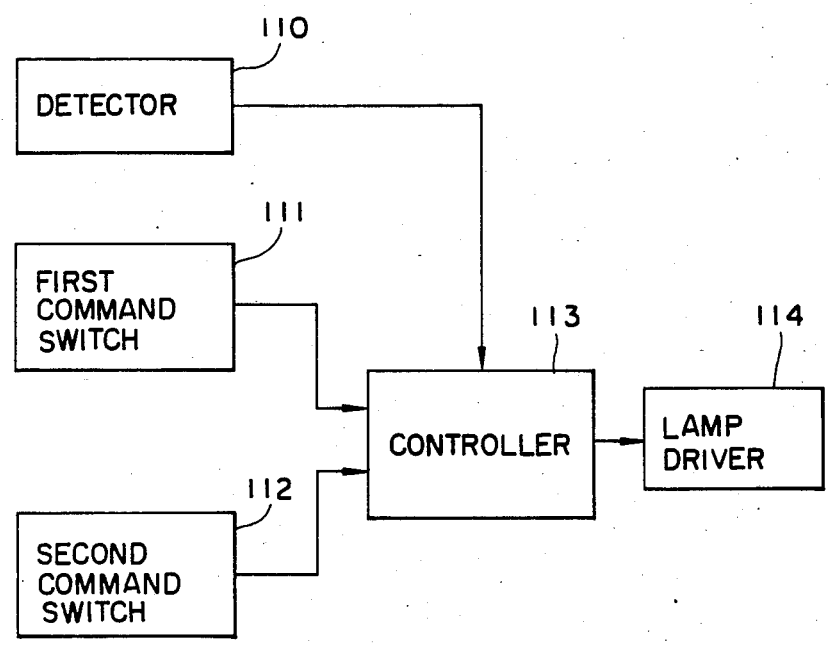
FIG. 22 is a functional block diagram showing main elements of the copying apparatus embodying the present invention.

In the first place, the main features of the present invention will be briefly described with reference to FIG. 22 which shows in block diagram main elements of the copying apparatus embodying the present invention. In accordance with the principle of the present invention, an original surface or original holding surface on which an original document, such as a book or a sheet of paper, from which one or more copies are to be made is placed is split into first and second original surface sections, each of which is scanned by a light source which moves along the original surface, whereby two original images in the respective first and second original surface sections are reproduced on two separate copy surfaces, such as both sides of a copy sheet or two separate copy sheets. As shown in FIG. 22, the present copying apparatus includes a size detector 110 for detecting the size, in particular, length of a copy sheet set to be ready for use in the copying apparatus. The illustrated copying apparatus also includes a first command switch 111 for giving a command of copying operation including the order of reproduction of the first and second original surface sections and a second command switch 112 for giving a command to make a copy for either one of the first and second original surface sections.

Depending on which of the first and second command switches 111 and 112 is activated, the range of scanning of a light source for illuminating a selected portion of the original surface on which an original document is placed is calculated by a controller 113 using a predetermined reference position for the light source in relation to the length of a copy sheet detected by the detector 110, and, then, a lamp driver 114 is activated by an output from the controller 113 so that the light source is moved along the original holding surface thereby scanning an original image to be copied on the surface. In this manner, the range of movement of the light source for scanning an original document to be copied is automatically determined in relation to the size or length of a copy sheet to be used for copying.

Now, referring to FIG. 1a, an example of the fundamental structure of the present invention will be described. That is, in accordance with the present invention, in the case where the first original surface section X is scanned or illuminated by the movable light source 3 and also in the case where the second original surface section Y is illuminated, the light source 3 initiates its operation from the same reference position, e.g., home position indicated by the solid line in FIG. 1a, so that its reference position is fixed at this single location. In addition, the scanning distance over which the light source 3 moves when illuminating each of the original surface sections X and Y is determined not by the length Z of original 2 but by the length of copy sheets to which the original images in the first and second original surface sections are copied.

For example, in the case where, in the first place, the first original surface section X is to be illuminated and then the second original surface section Y is to be illuminated, the size or length of copy sheets to which the original images in the first and second original surface sections are to be copied is detected in advance, and the light source 3 is moved in the direction indicated by the arrow S from the reference position (home position) indicated by the solid line, so that the light source 3 first arrives at an effective illumination initiation position indicated by the dotted line from where effective light may be irradiated to the first original surface section X and then moves in the direction indicated by the arrow S over a distance corresponding to the length of a copy sheet used whereby the light source 3 arrives at the intermediate position indicated by the one-dotted line. Thereafter, similarly, the light source 3 is caused to further move in the direction indicated by the arrow S over the distance corresponding to the previously detected length of a copy sheet in use so that the light source now reaches the terminal end position indicated by the two-dotted line, during which period the second original surface section is scanned or illuminated.

On the other hand, in the case where the second original surface section Y is first scanned and then the first original surface section X is scanned to make a copy from each of the originals located in the respective first and second original surface sections, the light source 3 is first caused to move in the direction indicated by the arrow S from its home position indicated by the solid line, and, as soon as the light source 3 arrives at the effective illumination initiation position or intermediate position in the present case as indicated by the dotted line, effective light starts to be irradiated toward the second original surface section Y. Also in this case, the light source 3 is caused to scan over the distance corresponding to the length of a copy sheet in use from the effective illumination initiation position indicated by the one-dotted line to the terminal end position indicated by the two-dotted line, during which period the second original surface section Y is illuminated. Then, the light source 3 is caused to return to the home position, and, then, the light source 3 is again caused to move from this reference position in the direction indicated by the arrow S so as to carry out illumination of the first original surface section X. In this case also, the moving distance of the light source 3 from the effective illumination initiation position indicated by the dotted line to the terminal position indicated by the one-dotted line is determined by the length of a copy sheet in use. Of course, the distance traversed by the light source 3 from the home position indicated by the dotted line to the effective illumination initiation position indicated by the one-dotted line for illumination of the second original surface section Y is also determined by the length of copy sheets in use.

Also in the case where only the second original surface section Y of a book original 2 or the right-hand half of a sheet type original is to be copied, the original is placed on the contact glass 1 in normal posture and without rotation and the light source 3 also initiates its scanning operation from the home position, whereby effective light is irradiated to the second original surface section Y while the light source 3 moves from the effective illumination initiation position indicated by the one-dotted line to the position indicated by the two-dotted line, thereby making a copy of the original image placed in the second original surface section Y. Also in this case, the distance over which the light source 3 carries out light irradiation is determined by the length of copy sheets used.

As described above, the length of the first and second original surface sections X and Y in the moving direction of the light source indicated by the arrow S, i.e., the distance over which the light source 3 moves in the direction of S during illumination of each of the first and second original surface sections X and Y either is equal to the length of copy sheets used for making copies of the original images in these sections X and Y thereon or at least corresponds to the length of copy sheets used. Accordingly, as described above, by providing a structure for detecting the length of copy sheets used and moving the light source 3 over a distance corresponding to the copy sheet length, for any size of copy sheets used, it is insured that the light source 3 initiates its scanning operation from the one and identical reference position, or home position in the illustrated embodiment, and it moves over a predetermined distance for scanning so that a copy of each of originals placed in the respective first and second original surface sections X and Y can be made without any problem. As a result, as different from the prior art, there is no need to provide an extra means for detecting the boundary or intermediate position of an original to be copied, and the position where the light source 3 initiates its operation is prevented from becoming inaccurate, not to mention the capability to achieve simplification in operation. It is to be noted, further, that, in accordance with the present invention, even in the case when only the second original surface section Y is to be copied, there is no need to place the original in a special fashion on the contact glass 1.

Now, a more specific embodiment of the present invention when applied to an electrophotographic copying apparatus will be described more in detail with reference to FIG. 2. As shown, the overall structure of a copying apparatus constructed in accordance with one embodiment of the present invention is illustrated in FIG. 2, and the illustrated copying apparatus has a multiple modes of operation, such as unfolding copy mode or right half copy mode, as will be made clear later as one reads along.

Figure 2:
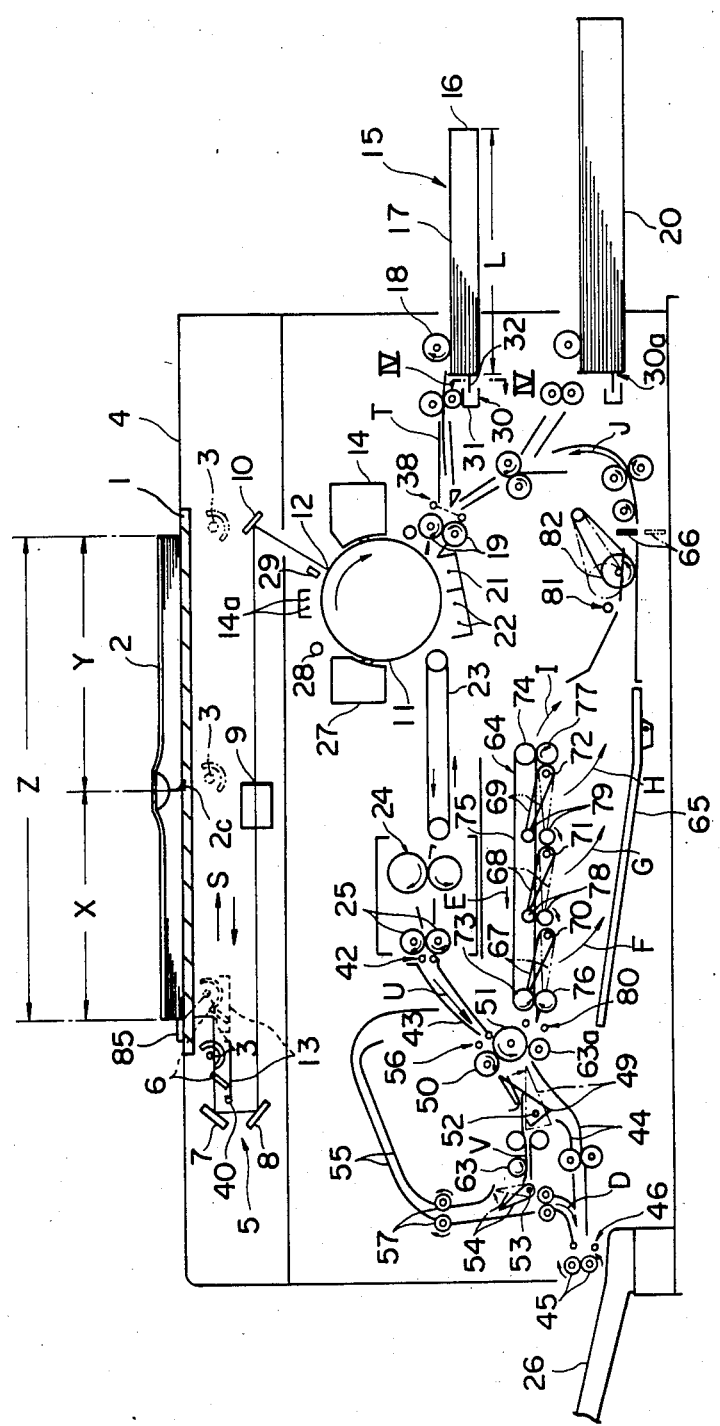
FIG. 2 is a schematic, cross-sectional view showing the overall structure of an electrophotographic copying apparatus constructed in accordance with one embodiment of the present invention.

In FIG. 2, the copying apparatus 4 includes a main body or housing 4 and a contact glass 1 which defines an original holder or original holding surface on which an original document 2 (book original in the illustrated embodiment) from which one or more copies are to be made may be placed and which is mounted at the top of the main body 4. Below the contact glass 1 is disposed an optical system 5 containing a light source 3 for illuminating the original document 2 placed on the contact glass 1.

During copying operation, the light emitted from the light source 3 of the optical system 5 illuminates the original document 2 and the light reflected therefrom is again reflected by first, second and third reflecting mirrors 6, 7 and 8, respectively, and then the thus reflected light, after passing through a lens 9, comes to be reflected by a fourth mirror 4 fixedly mounted on the main body 4 and reaches an exposure position 12 on the peripheral surface of a photosensitive drum 11 which is rotatably supported by the main body 4, where a projected image of the original image is formed. The light source 3 is supported on a scanner 13 together with the first mirror 6, and, as will be described more in detail later, it scanningly moves in the direction indicated by the arrow S due to the operation of the scanner 13. The second and third mirrors 7 and 8 are also supported by other scanners (not shown) and they move in the same direction as that of the light source 3.

The home position is defined as a stand-by position of the scanner 13, and, during non-copying period, a home position switch 40 is held to be ON by the scanner 13 itself or an actuator member (not shown) fixedly mounted on the scanner 13. In the present embodiment, this switch is shown to have a mechanical structure; it is to be noted, however, that this switch can be formed by any other type, such as a photoelectric sensor type switch, if desired. It should further be noted that in the illustrated copying apparatus, the rate of magnification can be varied by moving the lens 9 and other predetermined optical elements associated therewith in the direction of the optical axis of the lens 9.

As indicated by the arrow in FIG. 2, the photosensitive drum 11 is driven to rotate clockwise at constant speed, during which the peripheral surface of the drum 11 is charged to a predetermined polarity by means of a corona charger 14a, a light image is irradiated to the thus charged portion of the peripheral surface of the drum 11 from the original document 2 in a manner described above thereby forming an electrostatic latent image corresponding to the original image of the original document 2 on the peripheral surface of the drum 11. The latent image thus formed is then moved past a developing device 14, whereby the latent image is converted into a toner image by development. On the other hand, from a quantity of copy sheets 17 stored as stacked in a cassette 16 detachably mounted in a sheet feeding section 15 of the present copying apparatus, the topmost sheet 17 is caused to advance in the direction indicated by the arrow T from the cassette 16 by means of a pick-up roller 18. The copy sheet 17 thus fed is temporarily held stationary by a registration roller 19 as will be described more in detail later and then it is transported to be in contact with the drum 11 in registration with the toner image formed on the drum 11. The sheet feeding section 15 of the present copying apparatus is also provided with a second sheet feeding cassette 20 and these two cassettes 16 and 20 normally contain copy sheets of different size and are used selectively.

The copy sheet 17 thus brought into contact with the drum 11 moves as attached to the peripheral surface of the drum 11, and, while it moves past a transfer corona charger 21, the toner image on the drum 11 is transferred to the copy sheet 17. Then, as the drum 11 further rotates, the copy sheet 17 to which the toner image has been transferred moves past a separation corona charger 22 so that the copy sheet 17 is separated from the drum 11 to ride on a transportation belt 23. Thus, the copy sheet 17 is caused to pass through a fixing device 24 whereby the toner image is fixedly attached to the copy sheet 17. After such image fixing, the copy sheet 17 is transported by feed rollers 25 and other elements so that it is finally discharged onto a tray 26 as will be described more in detail later.

On the other hand, after image transfer, the peripheral surface of the drum 11 is presented to a cleaning device 27 where any residual toner remaining on the peripheral surface of the drum 11 is removed, and, then, in the next step, any remaining charge is removed from the peripheral surface of the drum 11 by means of a lamp 28. Between the exposure position 12 of the drum 11 and the corona charger 14a is disposed an eraser 29 typically comprised of a lamp, and, as will be described more in detail later, this eraser 29 removes charge from that portion of the peripheral surface of the drum 11 where no latent image should be formed thereby preventing any toner from being attracted to the undesired portion of the drum 11.

Figure 1A:
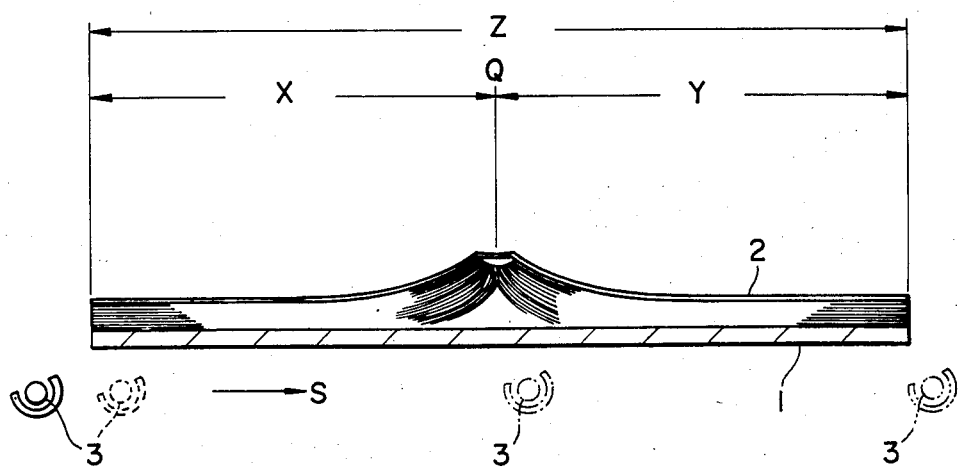
FIG. 1a is a schematic illustration showing a structure for holding and scanning an original, from which one or more copies are to be made, which constitutes part of an electrophotographic copying apparatus.

As may be obvious from the above description with reference to FIG. 1a, the distance over which the light source 3 scanningly moves during operation of the present copying apparatus is determined in accordance with the length of the copy sheet 17 used. Accordingly, one example of a detector for detecting the length of a copy sheet used, which may be advantageously applied to the present invention, will now be described with particular reference to FIGS. 2, 3 and 4. As shown, the copy sheet length detector 30 generally includes a photoelectric sensor unit 31 and a light shielding member 32 fixedly mounted on the cassette 16 for storing therein a quantity of copy sheet 17. The sensor unit 31 includes a support member 33 having a generally C-shaped cross section and plural pairs (five pairs in the illustrated embodiment) of a light source 34 and a light-receiving element 35 disposed opposite to each other as mounted on the top and bottom sections of the support member 31 such that the light emitted from each of the light sources 34 impinge upon the corresponding one of the light-receiving elements 35.

Figure 3:
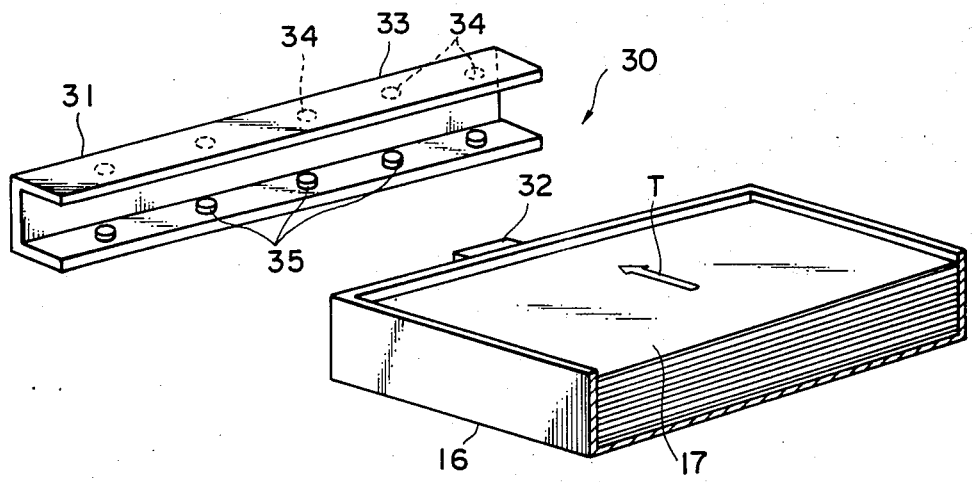
FIG. 3 is a schematic, perspective view showing a copy sheet size detecting device including a sensor unit and its associated member mounted on a cassette.
Figure 4:
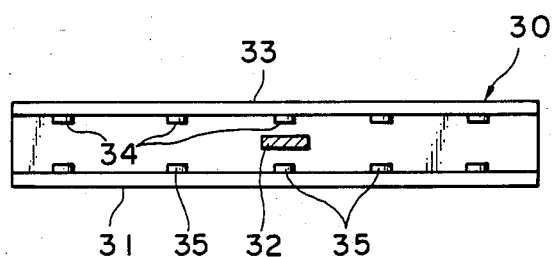
FIG. 4 is a schematic, cross-sectional view taken along line IV—IV indicated in FIG. 2.

When the cassette 16 is detachably set in position as partly inserted into the main body 4 of the copying apparatus as shown in FIG. 2, the light shielding member 32 fixedly attached to the cassette 32 at its front end comes to be located between one or more pairs of light source 34 and light-receiving element 35 so that the light emitted from those light sources 34 are blocked by the light shielding member 32 and thus prevented from being impinged on the corresponding light-receiving elements 35. The light shielding member 32 is mounted at the front end of the cassette 32 at a position in association with the length L (in the feeding direction T) of copy sheets 17 stored in the cassette 16 in the form of a stack. For this reason, those pairs of light source 34 and light-receiving element 35 that correspond to the length of the copy sheets 17 are optically decoupled, which fact is used to detect the length L of the copy sheets 17 stored in the cassette 16. For those cassettes storing therein copy sheets of different length, light shielding members different in position or number corresponding to the lengths of the copy sheets stored are provided, so that when these cassettes are selectively mounted to the main body 4 of the copying apparatus, those pairs of light source 34 and light-receiving element 35 are optically decoupled thereby detecting the length of the copy sheets stored in the cassette thus mounted. In the case where five pairs of light source 34 and light-receiving element 35 are provided in the length detector 30 as shown in FIGS. 3 and 4, it is possible to detect as many as 25 different kinds of copy lengths by having one or more pairs of light source 34 and light-receiving element 35 selectively. It is to be noted that the second copy sheet feeding cassette 20 is also provided with a similar copy sheet size detector 30a. It should further be noted that in the embodiment shown in FIGS. 2 through 4, the detectors 30, 30a can detect not only the length L of the copy sheet 17, but also the width thereof. It should further be noted that other length detecting means than those 30, 30a described above may also be used for detecting the length of the copy sheets 17 stored in the cassettes 16, 20.

Now, various modes of copying operation of the copying apparatus shown in FIG. 2 will be described in detail below.

Figure 5:
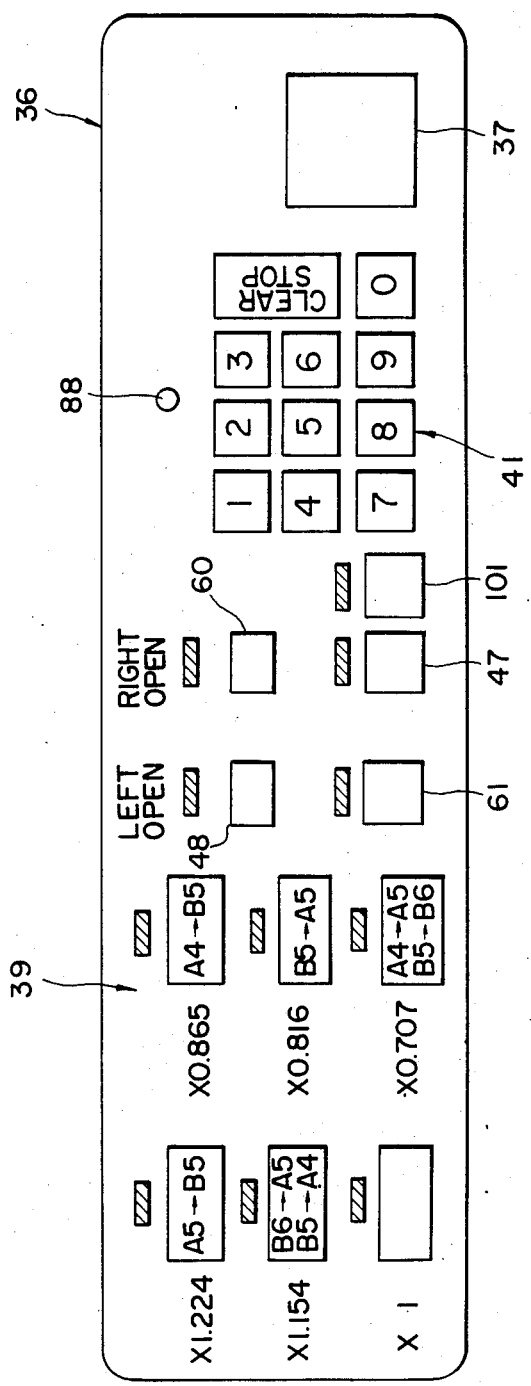
FIG. 5 is a plan view showing a control panel including a key input section mounted on the housing of the copying apparatus shown in FIG. 2.
Figure 6:
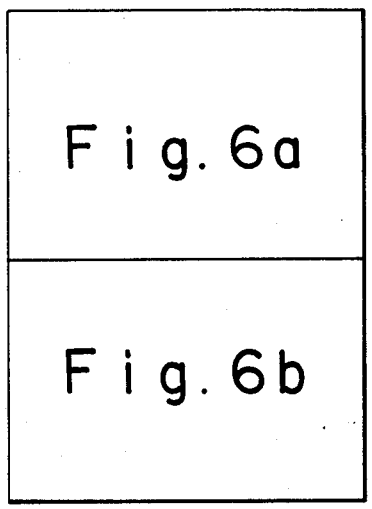
FIGS. 6 through 9 are illustrations showing how FIGS. 6a and 6b, 7a and 7b, 8a and 8b, 9a and 9b should be placed together, respectively.

FIG. 5 schematically shows in plan view a control panel or key input section 36 mounted on the main body 4 of the present copying apparatus. The following description regarding various modes of copying operation should be read with reference to not only FIG. 2, but FIGS. 6a and 6b combined and FIGS. 7a and 7b combined, showing the flow chart illustrating the steps of the main control sequence of the copying apparatus along the transportation of a copy sheet and FIGS. 8a and 8b combined and FIGS. 9a and 9b combined, showing the flow chart illustrating the control sequence of the optical system 5.

NORMAL COPY MODE

As different from the case shown in FIG. 1a, in which the copying operation takes place while splitting the original holding surface into two sections, the NORMAL COPY MODE is a mode which is carried out most commonly such that the original holding surface is scanned once to carry out a copying operation. Thus, in this mode of operation, the original 2 is placed in position on the contact glass 1 with its left-hand side in abutment against the vertical reference member 85. It is to be noted that the original is always placed in position on the contact glass 1 in any other modes of operation in accordance with the principle of the present invention.

Figure 6A:
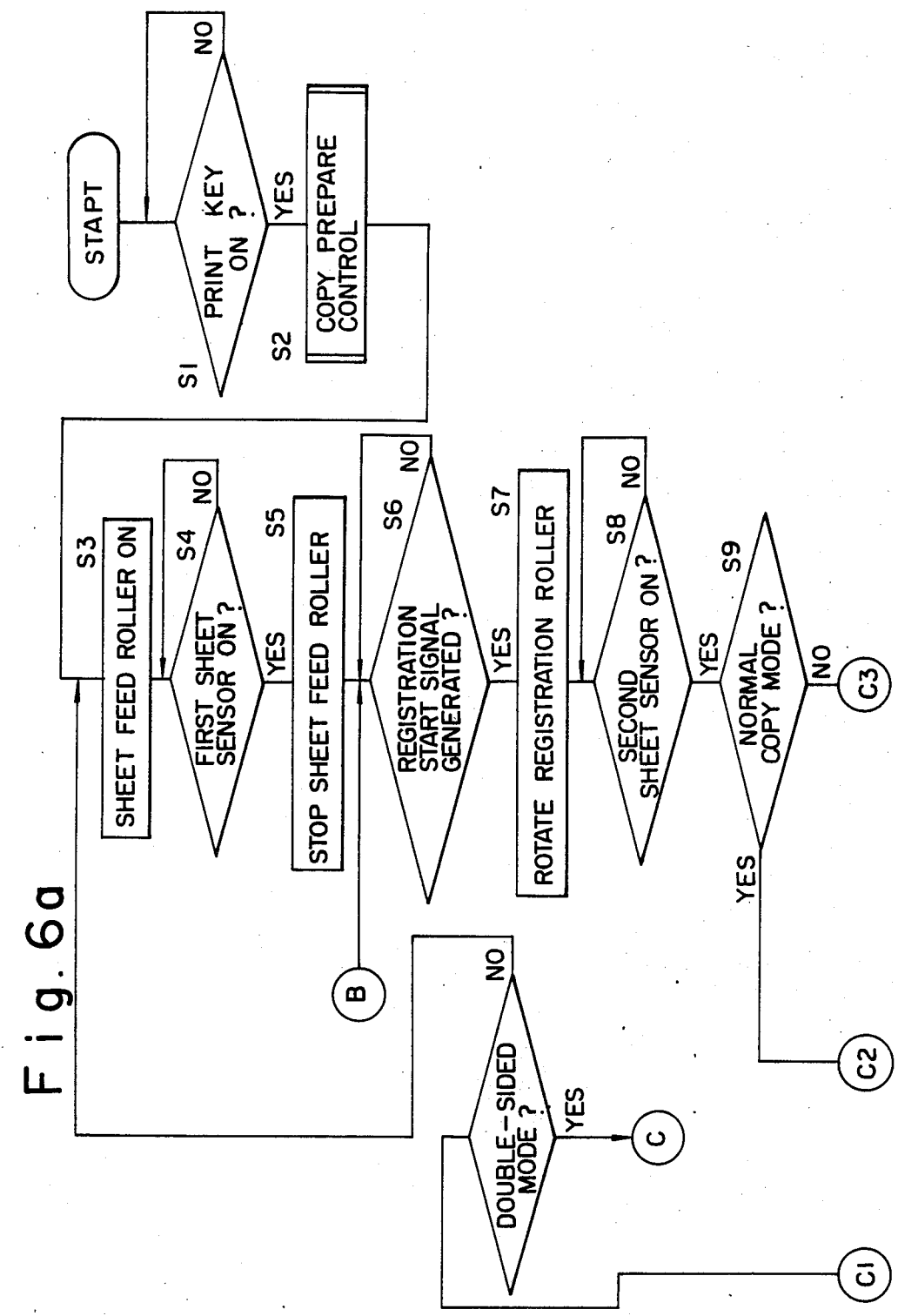
FIGS. 6a and 6b and 7a and 7b, when combined, respectively, show a flow chart illustrating the transporting condition of a copy sheet and the control condition associated wherewith.
Figure 6B:
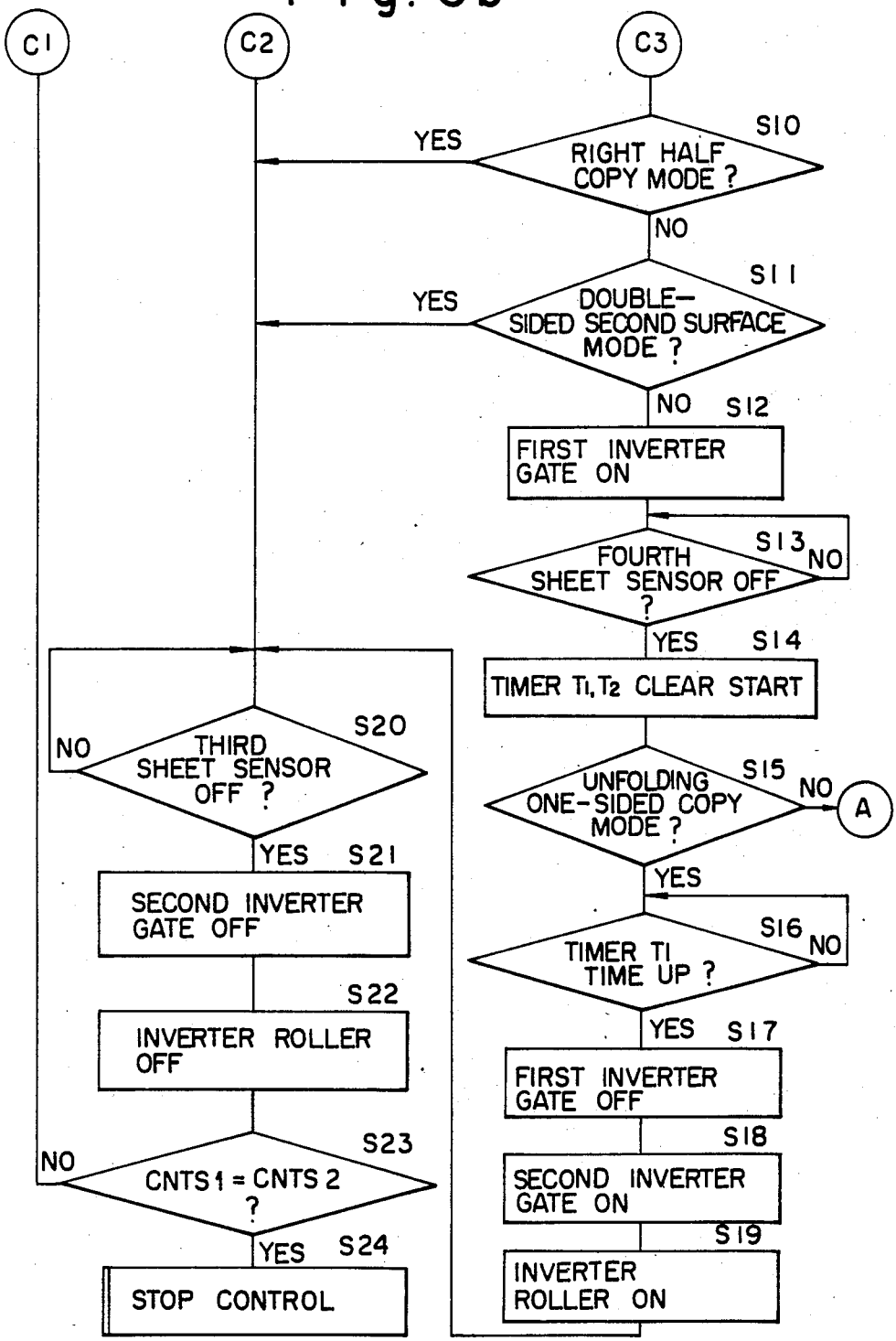

With the original 2 so placed on the contact glass 1, when a print key switch 37 in the key input section 36 shown in FIG. 5 is first depressed (FIG. 6a, S1), those elements, such as corona units 14a, 21 and 22, charging removing lamp 28, eraser 29, developing device 14, cleaning device 27, and photosensitive drum 11, are activated to carry out the preparatory control operation (FIG. 6a, S2). Then, the pick-up roller 18 is turned on (FIG. 6a, S3) so that the topmost sheet of the copy sheets 17 stored as stacked in the cassette 16 is fed toward the registration roller 19. When the leading edge of the copy sheet 17 thus fed has turned on a first copy sheet sensor 38 disposed in the vicinity of the registration roller 19 (FIG. 6a, S4), there is produced a detection signal which then causes to stop the pick-up roller 18 (FIG. 6a, S5) so that the copy sheet 17 becomes motionless with its leading edge in engagement with the registration roller 19.

Then, in association with the rotational timing of the photosensitive drum 11, there is produced a registration start signal in a manner as will be described later (FIG. 6a, S6) so that the registration roller 19 starts to rotate (FIG. 6a, S7), whereby the copy sheet 17 comes to be transported toward the photosensitive drum 17. On the other hand, regarding the optical system 5, the scanner 13 and light source 3 located at the home position indicated by the solid line in FIG. 2 start to move in the direction indicated by the arrow S through operation of a stepping motor (not shown) and first arrives at the effective illumination initiation position, i.e., the position where effective light begins to be irradiated to the surface of the original document 2 placed on the contact glass 1, and, in succession, they move in the direction indicated by the arrow S, during which time period the surface of the original document 2 is scanningly illuminated thereby forming an electrostatic latent image on the drum 11. Upon arriving at the terminal end position, the stepping motor is driven to rotate in the reversed direction so that the scanner 13 and light source 3 are caused to move in the direction opposite to the direction S toward the home position. It is to be noted that in the illustrated embodiment the total length Z of the original document 2 placed on the contact glass 1 is reproduced during the NORMAL COPY MODE operation, so that the terminal end position for the light source 3 in this case is the position indicated by the two-dotted line in FIG. 2.

While the light source 3 moves from the home position to the effective illumination initiation position indicated by the dotted line, the drum 11 is driven to rotate so that its peripheral surface becomes charged by the corona charger 14a over some distance. Accordingly, if no measure were taken, the corresponding portion of the drum 11 would be developed by the developing device 14, resulting in deposition of toner in that portion, where no toner should be deposited. Under the circumstances, during the preparatory control sequence (FIG. 6a, S2) the eraser 29 is turned on to remove any charge from that portion of the drum 11 where no latent image is to be formed, and the eraser 29 is turned off at a time when the light source 3 has arrived at the effective illumination initiation position or immediately therebefore or thereafter, thereby allowing to form an electrostatic latent image on the intended section of the drum 11 thereafter. Furthermore, after arriving at the terminal end position, when the light source 3 initiates its return movement toward the home position or immediately therebefore or thereafter, the eraser 29 is turned on thereby removing any residual charge from that portion of the drum 11 where no latent image is to be formed. Incidentally, in the illustrated embodiment, for the sake of brevity of explanation, it will be assumed in the following description that the eraser 29 is turned off at the time when the light source has arrived at the effective illumination initiation position and it is turned on at the time when the light source 3 has just arrived at the terminal end position and at the same time starts to initiate its return motion. Excepting some special cases, this assumption holds true in other copy modes than the NORMAL COPY MODE. It should also be noted, however, that the actual positions of the effective illumination initiation position and the terminal end position of the light source 3 may differ depending on various modes of copying operation as will become clear later.

The timing of initiation of operation of the above-described scanner 13 and light source 3, the distance travelled by each of these elements and the above-described on/off control of the eraser 29 take place in the following manner as shown in FIGS. 8a, 8b and 9a, 9b.

It is first checked as to whether a right-hand half key switch 101 (FIG. 5) for selecting a RIGHT-HAND HALF COPY MODE which will be described later has been turned on or not (FIG. 8a, S50). Since the NORMAL COPY MODE has been selected in the present case, following the check of the RIGHT-HAND HALF COPY MODE, it is checked as to whether it is an UNFOLDING COPY MODE or not (FIG. 8a, S53). Then, following the check of the UNFOLDING COPY MODE, it proceeds to the step for detecting the length of the copy sheet 17 by means of the detector 30. That is, before the light source 3 starts its scanning operation, the length L of the copy sheet 17 is detected by the detector 30 shown in FIGS. 2 through 4, and this length data thus detected is transferred into an accumulator Acc of a microcomputer (FIG. 8a, S67), where scan data is calculated (FIG. 8a, S68) as will be described below next. There are three kinds of scan data, which are once stored in a memory as the values corresponding to the counts and then stored into respective registers R1, R2 and R3.

(1) Scan data to be stored in register R1

This is a time data from the time when the home position switch 40 has been turned off due to the initiation of the movement of the scanner 13 from the home position, together with the light source 3, to the time when the eraser 29 is turned off upon arrival of the light source 3 at the effective illumination initiation position.

(2) Scan data to be stored in register R2

This is a time data from the time when the home position switch 40 has been turned off due to the initiation of the movement of the scanner 13 from the home position, together with the light source 3, to the time when the before-mentioned registration start signal is generated.

(3) Scan data to be stored in register R3

This is a time data from the time when the home position switch 40 has been turned off due to the initiation of the movement of the scanner 13 from the home position, together with the light source 3, to the time when the light source 3 arrives at the terminal end position.

The above-described three scan data vary depending on the length L of the copy sheet 17, i.e., the length data detected by the length detector 30, and also depending on a particular copy mode of operation selected.

In the NORMAL COPY MODE, based on the scan data described above, "SCAN Z" shown at step S69 in FIGS. 8 and 9 is carried out. That is, each scan data is once stored in the memory, and it is retrieved at the time of implementation of SCAN Z and stored into each register. Scan data Z1, Z2 and Z3 shown at step S69 in FIG. 9 are the above-described scan data (1) through (3) in the NORMAL COPY MODE. In this case, each scan data is converted (FIG. 9, S83) into a value according to a magnification ratio designated by depression of any one of magnification keys 39 in the key input section 36 in advance (FIG. 5). This is because, since the distance travelled by the scanning operation of the light source 3 differs depending on the magnification ratio even if the length L of the copy sheet 17 is the same, the scan data must be corrected in accordance with the magnification ratio. Alternatively, the scan data may be calculated in advance by taking into consideration of the magnification ratio. Then, as described before, the light source 3 and the eraser 29 are turned on, i.e., lit, so that the scanner 13, together with the light source 3, starts to move from the home position (FIG. 9, S84). With this, the photosensitive drum 11 begins to be subjected to image exposure, and, at the same time, as described previously, charge is removed from that portion of the photosensitive drum 11 where no image is to be formed by means of the eraser 29. When the scanner 13 starts its operation from the home position, the home position switch 40 is turned off so that the initiation of operation of the light source 3 is detected (FIG. 9, S84). That is, with turning off of this switch 40, the pulse counter is cleared and starts counting (FIG. 9, S85), and when the count of the pulse counter has come into agreement with the scan data Z1 stored in the register R1 (FIG. 9, S86), the eraser 29 is turned off (FIG. 9, S87). At this time, the light source 3 has arrived at the effective illumination initiation position indicated by the dotted line in FIG. 2, so that the position of the leading edge of an electrostatic latent image to be formed on the photosensitive drum 11 is determined at this point in time. Thereafter, when the count of the pulse counter has come into agreement with the scan data Z2 stored in the register R2 (FIG. 9, S88), the registration start signal as described before is generated (FIG. 6, S6, and FIG. 9, S89), so that the registration roller 19 starts to rotate as described before thereby causing the copy sheet 17 to be transported toward the photosensitive drum 11.

Even thereafter, the scanner 13, together with the light source 3, scanningly moves in the direction indicated by the arrow S, and when the count of the pulse counter has come into agreement with the scan data Z3 (FIG. 9, S90), i.e., the light source 3 having arrived at the terminal end position indicated by the two-dotted line, the light source 3 is turned off as described before (FIG. 9, S91), and, at the same time, the eraser 29 is turned on (FIG. 9, S92), whereby the scanner 13 and the light source 3 begin to return to their home position (FIG. 9, S93). When the light source 3 has reached the home position, the before-described home position switch 0 is turned on (FIG. 9, S94), which then causes the scanner 13 to stop (FIG. 9, S95) thereby waiting the next start signal. Such a scan operation is repeated over the number of times, which is defined as CNTS1 and designated in advance by the depression of the numeric keys 41 in the key input section 36.

When the scanner 13 and the light source 3 have arrived at the effective illumination initiation position or the terminal end position, a predetermined operation is carried out through the operation of the home position switch 40 as described above, whereas, when the scanner 13 and the light source 3 have returned to the home position, the scanner 13 is brought to a halt through the operation of the switch 40. In this manner, the scanner 13 and the light source 3 operate with their home position as a reference. On the other hand, for example, the scan data Z1 may also be calculated from the distance between the home position of the light source 3 and the effective illumination initiation position and the scanning speed of the light source 3, and, furthermore, the scan data Z3 may be calculated from the sum of the length 1 of the copy sheet 17 (L=Z when the magnification ration is unity) and the distance between the home position and the effective illumination initiation position and the moving speed of the light source 3. In addition, the scan data Z2 may be calculated from the relation such as the distance from the registration roller 19 to the transfer station and the position of the leading edge of the latent image formed on the drum 11, such that the leading edge of the toner image formed on the drum 11 matches with the leading edge of the copy sheet 17. However, since the distance from the home position to the effective illumination initiation position remains at constant irrespective of the length of the copy sheet used, there is no need to carry out calculation for this each time, but, in any way, each scan data is calculated using the reference position of the light source, i.e., the home position in the illustrated example, as a reference.

On the other hand, the copy sheet 17 passing through the fixing device 24 after having been removed from the photosensitive drum 11 comes into engagement with a second copy sheet sensor 42 (FIG. 2), thereby causing it to be turned on (FIG. 6, S8), so that it is transported as guided by guide plates 43, 44 as indicated by the arrow U. Then, it is checked as to whether it is the NORMAL COPY MODE or not (FIG. 6, S9), and, the copy sheet 17 passes through a third copy sheet sensor 46 provided in the vicinity of a sheet discharging roller 46 to be discharged onto the tray 26. The third copy sheet sensor 46 is turned off when the trailing edge of the copy sheet 17 passes therethrough (FIG. 6, S20), thereby counting the number of copy sheets. When this count (CNTS2) comes into agreement with a predetermined number (CNTS1) of repetitions (FIG. 6, S23 and FIG. 8, S70), the stop control operation (FIG. 6, S24) is carried out. On the other hand, if no agreement is obtained, the next copy sheet 17 starts to be fed toward the photosensitive drum 11.

Incidentally, second inversion gate off and inversion roller of operations shown in FIG. 6 at S21 and S22, respectively, will be described later when explaining other modes of operation.

UNFOLDING ONE-SIDED COPY MODE

Figure 1B:
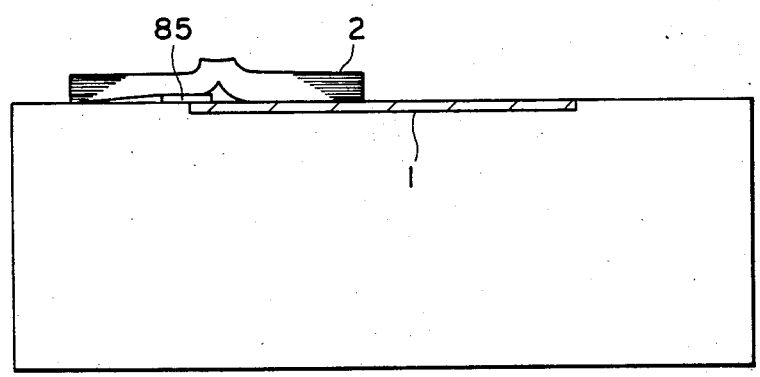
FIG. 1b is a schematic illustration showing a prior art technique of making copy from one page of an open book placed on the contact glass with its open side facing downward.

As shown in FIG. 1, the UNFOLDING COPY MODE indicates a mode of copying operation in which the original 2 having two original images is placed on the contact glass 1, one original on the first original holding surface section X and the other original on the second original holding surface section Y, whereby one of the these two original holding surface sections X and Y is first scanned to make a copy image on a first copy surface and then the other is scanned to make a copy image on a second copy surface. Thus, the original holding surface is effectively split in two sections X and Y which are scanned one after another in separate cycle of scanning operation. Thus, the UNFOLDING COPY MODE is directly concerned with the present invention. Moreover, the UNFOLDING ONE-SIDED COPY MODE is a mode of copying operation in which the copy images made in the first and second separate scanning operations are formed on two separate copy sheets; whereas, the UNFOLDING BOTH-SIDED COPY MODE is a mode of copying operation in which these two copy images are formed on both sides of a single copy sheet, one for each side.

The UNFOLDING COPY MODE is set by the depression of an UNFOLDING key switch 47 in the key input section 36 shown in FIG. 5. This mode is released when the same key switch 47 is depressed again.

The UNFOLDING COPY MODE is used not only for a book type original but also for a sheet type original, but since its principle resides in split scanning, or the original holding surface being split in two sections which are scanned one after another, so that it is more often than not that it is used for book type originals. Thus, a book type original will be examined first. There are basically two different kinds of book type originals. That is, FIG. 10 shows a book type original which may be referred to as a left-open book since its page number goes from left to right so that each page will be turned open to left. On the other hand, FIG. 11 shows the other kind of book type original which may be referred to as a right-open book since its page goes from right to left. An experience shows that, when an operator makes copies from a book type original, copies are normally made form a lower number to a higher number.

Taking this into consideration, in the present copying apparatus, it is so set that the book type original 2 is to be placed on the contact glass 1 as being open with its original images facing downward and in contact with the top surface of the contact glass 1 as shown in FIG. 12. In this case, the top edge 2a of the book original 2 is located away from the operator and the bottom edge 2b of the book original 2 is located closer to the operator and in registry with the bottom side of the contact glass 1. The left hand side of the book original 2 facing downward is located in registry with the left-hand side of the contact glass 1. In addition, one of the two open pages is located in the first original holding surface section X and the other open page is located in the second original holding surface section Y. It is to be noted that the first and second original holding surface sections X and Y are not so marked on the contact glass 1, but these surface sections X and Y are so defined automatically when the book original is placed on the contact glass 1 with its one side in registry with the left-hand side of the contact glass 1 and its bottom edge in registry with the bottom side of the contact glass 1 as shown in FIG. 12.

It will now be described as to the case for making copies from a left-open book original in the UNFOLDING COPY MODE. As shown in FIGS. 2 and 12, the left-open book original 2 is placed on the contact glass 1. In this case, when the two opened pages are considered as the first and second original holding surfaces X and Y, the page number of the right-hand section, i.e., the second original holding surface section Y, is lower than the page number of the left-hand section, i.e., the first original holding surface section X. For example, if the book original 2 shown in FIG. 10 is placed on the contact glass 1 facing downward, page 53 defines the second original holding surface section Y and page 54 defines the first original holding surface section X.

Then, when the UNFOLDING KEY SWITCH 47 of the key input section 36 is depressed, which is followed by the depression of the left open key switch 48 and the turning on of the print key switch 37, similarly with the case of the NORMAL COPY MODE, the control sequence of steps from the copy preparatory control operation to the stoppage of the pick-up roller (FIG. 6, S1-S5) is carried out so that the copy sheet 17 comes to set in the stand-by state in front of the registration roller 19 until the registration signal is generated.

On the other hand, the scanner 13 and the light source 3 of the optical system 5 move from the home position in the direction indicated by the arrow S thereby scanning the original surface, during which period, for the purpose of arranging completed copy sheets in the order of page numbers of the original, the page having a lower page number is first scanned and illuminated. Thus, in the present embodiment, the second original holding surface section Y is first scanned and illuminated. In this case, the scanner 13 and the light source 3 start from the home position, which is the reference position indicated by the solid line, move past the position indicated by the one-dotted line (This position is the effective illumination initiation position when the original surface Y of the left-open book original is to be copied in the UNFOLDING ONE-SIDED COPY MODE.) where effective light may be irradiated to the second original holding surface section Y and thus from where the second original holding surface section Y is scanned and illuminated until they reach the terminal end position indicated by the two-dotted line, and, thereafter, they return to the home position. In this case also, during time periods in which the light source 3 reaches the effective illumination initiation position from the home position and the light source 3 reaches the home position from the terminal end position, the eraser 29 is lit to remove charge from the photosensitive drum 11 thereby allowing to prevent unwanted toner from being attracted to the photosensitive drum 11. Following the copying operation for the second original holding surface section Y, the copying operation is carried out for the first original holding surface section X, during which period, the operation of the optical system does not differ from that of the NORMAL COPY MODE excepting that the terminal end position in this case is defined as the position indicated by the one-dotted line. The specific control sequence of steps in this case will be described in detail below.

Figure 8:
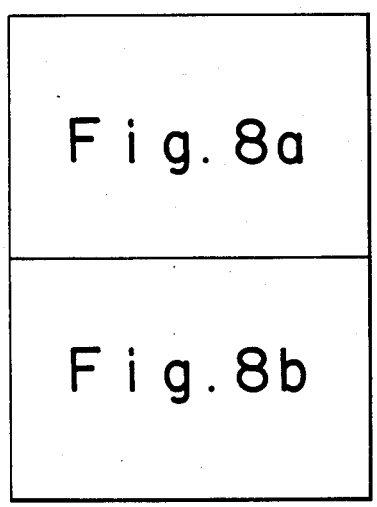
Figure 9:
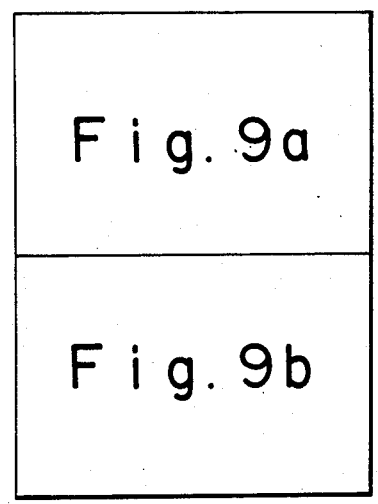

That is, as shown at step S53 in FIG. 8, it is checked as to whether the copy mode is the UNFOLDING COPY MODE or not and then the length of the copy sheet is detected by the length detector 30. Similarly with the case of the NORMAL COPY MODE, the length data of the copy sheet is transferred to the accumulator Acc (FIG. 8, S54) which is followed by the steps of calculating the scan data (FIG. 8, S55), storing the data temporarily in the memory as values corresponding to the counts, and storing them in the registers R1, R2 and R3, respectively, at the time of execution of the later-described scan Y and X. These scan data are the data (1) through (3) which have been described at the time of describing the NORMAL COPY MODE, but the actual values differ from those of the NORMAL COPY MODE and in the case of the UNFOLDING COPY MODE, scan data of Y1, Y2, Y3 and X1, X2, X3 (FIG. 9, S80, S81) are calculated. That is, the scan data Y1 is a time data to reach the effective illumination initiation position indicated by the one-dotted line from the home position indicated by the dotted line, Y2 is a time data from the time when the light source 3 has left the home position to the time when the registration signal is generated for feeding the copy sheet to the photosensitive drum so as to be aligned with the toner image on the photosensitive drum 11 corresponding to the second original holding surface section Y, and scan data Y3 is a time data for the light source to arrive at the terminal end position indicated by the tow-dotted line from the home position. Similarly with the scan data Z1, Z2 and Z3, these are calculated using the home position of the light source 3 as a reference based on the speed of the scanning movement of the light source 3 and the length L of the copy sheet. For example, the scan data Y1 may be calculated from the sum of the distance for the light source to reach the position indicated by the dotted line from the home position and the length L of the copy sheet 17 (for copying with unity magnification, L is half of the length Z of the original) and the moving speed of the light source, and, similarly, scan data Y3 may be calculated from the sum of the distance for the light source 3 between the home position and the position indicated by the dotted line and twice the length L of the copy sheet (in the case of unity magnification, it corresponds to the length Z of the original) and the moving speed of the light source 3. On the other hand, scan data X1 is a time data for the light source to reach the effective illumination initiation position indicated by the dotted line from the home position; scan data X2 is a time data from the time when the light source 3 has been started till the time when the registration start signal is generated for supplying the copy sheet to the photosensitive drum so as to be aligned with the toner image on the photosensitive drum 11 corresponding to the first original holding surface section X; and scan data X3 is a time data for the light source to reach the terminal end position indicated by the one-dotted line from the home position. These also differ in specific numeric values, but they may be calculated in the same procedure as in the cases for Z1, Z2, Z3 and Y1, Y2, Y3.

After calculation of the scan data, if the original 2 is a left-open book (FIG. 8, S56), based on the above-described scan data, "SCAN Y" (FIGS. 8 and 9, S57) is first carried out. Also for scan Y, scan data Y1, Y2 and Y3 are retrieved from the memory during its implementation, stored in the registers and processed similarly with the scan Z as shown in FIG. 9 S83 through S95. That is, the scanner 13 initiates its operation with the home position as a reference position, together with the light source 3, and, when they leave the home position, the home position switch 40 is turned off (FIG. 9, S84) so that the pulse counter is cleared and started (FIG. 9, S85). Then, as shown in FIG. 9 at step S86, since the eraser 29 remains on until the count of the pulse counter comes into agreement with the scan data Y1 stored in the register R1, i.e., the light source 3 arrives at the effective illumination initiation position indicated by the one-dotted line in FIG. 2, charge continues to be removed from the surface of the photosensitive drum 11 during this time period. Upon arrival of the light source 3 at the effective illumination initiation position, the eraser 29 is turned off so that the leading edge of the latent image on the photosensitive drum is determined. At that time, in the case of the book original 2, the marginal region between the opened two pages (FIG. 2) is dented toward the bound section of the book original so that the light reflecting from the book original 2 in this region has difficulty in arriving at the photosensitive drum 11. Thus, if that portion of the photosensitive drum 11 which corresponds to this region 2c were developed as it is, this portion would be colored by toner in the form of a shade; therefore, it is advantageous to somewhat delay the timing to turn off the eraser 29 thereby allowing to remove charge also from that portion of the photosensitive drum 11 which has received the light reflecting from the region 2c of the book original 2 to result in a completed copy image free of such a shade.

Thereafter, similarly with the NORMAL COPY MODE, when the count of the pulse counter has come into agreement with the contents of the register R2, i.e., scan data Y2 (FIG. 9, S88), the registration start signal is generated (FIG. 9, S89 and FIG. 6, S6). Then, the light source 3 arrives at the terminal end position indicated by the two-dotted line, whereby the count of the pulse counter comes into agreement with the contents Y3 of the register R3 (FIG. 9, S90) thereby terminating the illumination of the second original holding surface section Y (FIG. 9, S9). Thereafter, the light source 3 and the scanner 13 return to the home position (FIG. 9, S93) so that the home position switch 40 is turned on (FIG. 9, S94) thereby causing both of the light source 3 and the scanner 13 to be motionless (FIG. 9, S95) and be set in a stand-by state for the next cycle of operation. In this manner, the light source 3 starts and stops using the home position as its reference.

On the other hand, with the above-described registration start signal, the registration roller 19 starts to rotate (FIG. 6, S7), which causes to supply a copy sheet 17 toward the photosensitive drum 11 where the toner image on the drum 11 is transferred to the copy sheet 17, and, thereafter, the copy sheet 17 moves past the image fixing device 24 and the second sheet sensor 42 in a manner similarly with the NORMAL COPY MODE. When the sensor 42 is turned on (FIG. 6, S8), it is checked as to whether it is the NORMAL COPY MODE or not (FIG. 6, S9), which is followed by the step of checking as to whether it is the RIGHT-HALF COPY MODE or not (FIG. 6, S10); however, since this is neither the NORMAL COPY MODE nor RIGHT-HALF COPY MODE, it proceeds to the step to check as to whether it is the BOTH-SIDED SECOND SURFACE COPY MODE, which will be described later, or not (FIG. 6, S11), but since the present case is not the BOTH-SIDED SECOND SURFACE MODE, either, the first inversion gate 49 is turned on (FIG. 6, S12).

As shown in FIG. 2, the first inversion gate 49 is disposed somewhat downstream of the transport rollers 50, 51 which are located between the guide plates 43, 44, and it is pivotally supported thereby allowing to take either its off position indicated by the solid line or an on position indicated by the dotted line. During the NORMAL COPY MODE, the first inversion gate 49 takes the off position indicated by the solid line, so that the copy sheet 17 leaving the fixing device 24 is transported along its predetermined path as guided by the guide plates 43, 44 to be finally discharged onto the tray 26. On the other hand, during the UNFOLDING ONE-SIDED COPY MODE, the first inversion gate 49 is pivoted to take its on position indicated by the dotted line, as shown. Thus, the copy sheet 17 transported by the transport rollers 50, 51 is transported in the direction indicated by the arrow V in FIG. 2. In this case, the second inversion gate 54, which is supported to be pivotal around the pin 53, is set in its off position indicated by the solid line, so that the copy sheet 17 moves into a path defined by an inversion guide plate 55 without being interfered by the gate 54.

On the other hand, when a fourth sheet sensor 56 disposed in front of the transport rollers 50, 51 is turned off by the trailing edge of the copy sheet 17 (FIG. 6, S13), the timers T1, T2 are cleared and started (FIG. 6, S14). Then, after checking as to whether it is the UN- FOLDING ONE-SIDED COPY MODE or not (FIG. 6, S15), when the trailing edge of the copy sheet 17 has moved past the second inversion gate 54, the timer T1 is timed up (FIG. 6, S16) so that the first inversion gate 49 is turned off to pivot to its off position indicated by the solid line (FIG. 6, S17) and at the same time the second inversion gate 54 is turned on to be located at its on position indicated by the dotted line (FIG. 6, S18). Then, both of the inversion rollers 57 are turned on, that is they are pressed together with the copy sheet 17 sandwiched therebetween (FIG. 6, S19) so that the copy sheet 17 is transported in the direction indicated by the arrow D toward the tray. In this manner, the copy sheet 17 is discharged onto the tray 26 as being inverted.

When the trailing edge of the copy sheet 17 has moved past the third sheet sensor 46 to have the sensor 46 turned off (FIG. 6, S20), the second inversion gate 54 is turned off to return to its position indicated by the solid line so that the inversion rollers 57 are turned off thereby causing both of the rollers 57 to move away from each other (FIG. 6, S21, S22). Such an operation is repeated over a predetermined number of repetitions as defined by CNTS1 (FIG. 6, S23 and FIG. 8, S58), and, thereafter, the counter CNT for counting the number of copy sheets is cleared (FIG. 8, S59).

As described above, upon completion of the copying operation for the second original holding surface section Y, the previously calculated scan data X1, X2 and X3 are retrieved from the memory and stored into the respective registers, so that "SCAN X" is implemented (FIGS. 8 and 9, S60). In SCAN X, the light source 3 starts to move from the home position and moves past the position indicated by the dotted line in FIG. 2, i.e., the effective illumination initiation position for applying effective light to the first original holding surface section X, and upon arrival at the terminal end position indicated by the one-dotted line in FIG. 2, it returns to the home position. And, in association with this scanning operation of the light source 3, the operation similar to the SCAN Y is carried out excepting the operation for removing charge from that portion of the photosensitive drum 11 where no latent image should be formed by means of the eraser 29. Accordingly, also in this case, the light source 3 and the scanner 13 initiate and end the scanning operation from and at the home position, respectively. This scanning operation is controlled by the actuation or deactuation of the home position switch 40. When the SCAN X has been implemented over a predetermined number of repetitions (FIG. 8, S61 and FIG. 6, S23), the copying apparatus implements the termination control routine and ceases its operation (FIG. 6, S24). If necessary, the book original 2 is lifted above the contact glass 1 temporarily and it is placed on the contact glass 1 again after turning to new pages, and, then, the copying operation for the first and second original holding surface sections X and Y is carried out in a manner described above.

As described above, in the UNFOLDING COPY MODE, similarly with the case described with reference to FIG. 1, the light source 3 initiates its scanning movement from the same reference position (home position in the illustrated embodiment) both in the case for illuminating the first original holding surface section X and in the case for illuminating the second original holding surface section Y, and yet the scan data X1, X2, X3 and Y1, Y2, Y3 are determined in accordance with the length of the copy sheet for copying each of the original images at the first and second sections X and Y in advance, which are used to determine the distance for the light source 3 to illuminate each of the first and second sections X and Y. For this reason, there is no need to detect the boundary position between the first and second sections X and Y by a detecting means each time as in the prior art.

Figure 13:
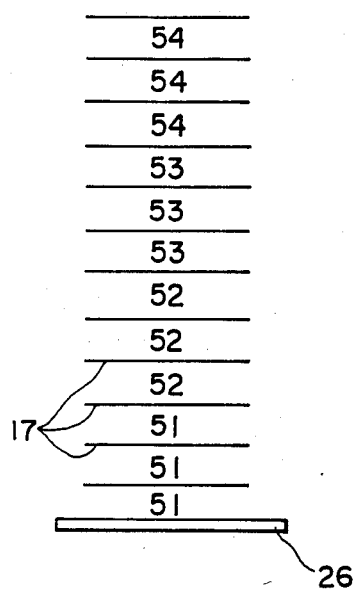
FIGS. 13 through 16 are illustrations showing several stack conditions of copy sheets discharged from the copying apparatus shown in FIG. 2.
Figure 14:
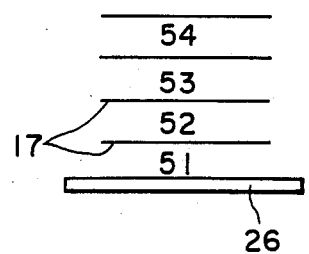
Figure 15:
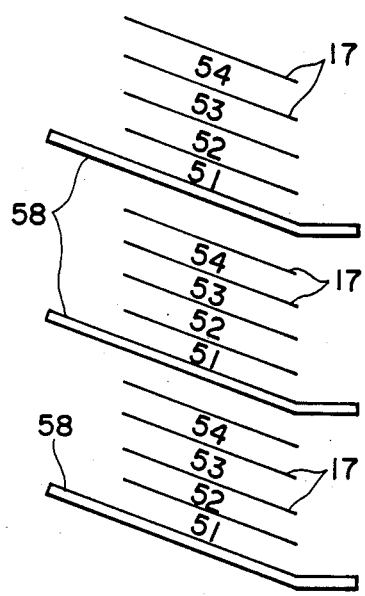

Furthermore, in the illustrated embodiment, during the implementation of SCAN X and SCAN Y, the two originals placed side by side on the contact glass 1 are copied one from another in succession in the order of the increasing page number and yet the copy sheet 17 is discharged onto the tray 26 after having been inverted by the inversion guide plate 55, so that the copy sheets 17 processed are stacked on the tray 26 in accordance with the order of pages copied. FIGS. 13 through 15 show how the copy sheets 17 processed are stacked when the pages 51 through 54 of the book original 2 have been copied. In each of these figures, the page number of an original image copied on the copy sheet 17 is indicated below the corresponding copy sheet 17. FIG. 13 shows the case in which three copies have been made for each of pages 51 through 54; FIG. 14 shows the case in which a single copy has been made from each of pages 51 through 54; and FIG. 15 shows the case in which a sorter well known for one skilled in the art is attached to the copying apparatus and three copies have been made from each of pages 51 through 54 and sorted out into three separate bins 58. As is obvious from these figures, the order of copy sheets 17 processed are stacked in the order of pages of the original.

The operation of copying pages of a left-open book original has been described above. Now, in the case of copying pages of a right-open book original, the UNFOLDING key switch 47 and the RIGHT-OPEN key switch 60 are turned on. In this case, the book original 2 is placed on the contact glass 1 facing downward as shown in FIG. 12, in which case the lower page is located in the left-hand section in FIG. 2 so that the copying operation proceeds such that the lower page located in the first original holding surface section X is copied first and then the higher page located in the second original holding surface section Y is copied next thereby allowing to obtain processed copy sheets 17 whose page numbers increase gradually. In this mode of copying operation, the light source 3 also initiates its scanning operation from the home position, and its specific copying operation is substantially the same as in the case of the above-described left-open book original excepting that the order of copying operation between the first and second sections X and Y is reversed, so that its detailed description will be omitted (cf. FIG. 8, S62 through S66).

It may be said that in certain areas there are many more left-open books than right-open books. Thus, there are many more chances to make copies from such left-open books. Focusing on this point, it may be advantageously so structured that the copying mode for a left-open book is automatically selected once the UNFOLDING key switch 47 is depressed without troubling to depress the left-open key switch 48 and the copying mode for a right-open book is selected only when the right-open key switch 60 is depressed. If so structured, the left-open key switch 48 may be eliminated thereby allowing to simplify the operation and the structure.

RIGHT-HALF COPY MODE

This is a mode of copying operation, as described previously, in which the original 2 is placed on the contact glass 1 facing downward with its left edge in abutment against the vertical reference plate 85 and only the right-half of the original surface located further away from the vertical reference plate 85, i.e., the second original holding surface section Y in FIG. 2 is copied. In another copying apparatus in which it has a vertical reference plate located at the right-hand side, i.e., opposite in position from the one shown in FIG. 2, and it is so structured that its light source initiates its scanning operation from the right-hand side of the apparatus, the opposite half of the original surface, i.e., the left-hand or first original holding surface section X is copied first. This case should be referred to as the LEFT-HALF COPY MODE. In either case, only that half of an original surface which is located further away from the vertical reference plate against which one side of the book original is abutted is copied.

The RIGHT-HALF COPY MODE is selected by the depression of the right-half key switch 101 in the key input section 36 shown in FIG. 5, and if the same key 101 is depressed for the second time, the RIGHT-HALF COPY MODE is released. After selection of this copy mode, if the print key switch 37 is turned on, similarly as in the case of each of the previously described copy modes, a sequence of steps from the copying preparatory control operation to the stoppage of the pick-up roller is implemented (FIG. 6, S1 through S5), and, then, the copy sheet 17 thus fed is set in a stand-by state in front of the registration roller 19 until the registration start signal is generated.

On the other hand, similarly with the previously described copy modes, the light source 3 and the scanner 13 of the optical system start their scanning movement in the direction indicated by the arrow S from the home position. So, the control operation under the circumstances will now be described.

That is, as shown in FIG. 8 at step S50, it is checked as to whether the present copy mode is the RIGHT-HALF MODE or not, the length of the copy sheet 17 is detected by the detector 30, the length of the copy sheet 17 thus detected is transferred to the accumulator Acc (FIG. 8, S51), the scan data are calculated (FIG. 8, S52) and these scan data are stored into the memory corresponding to counts. The scan data in this case include Y1, Y2 and Y3 (FIG. 9, S80), and after calculation of the scan data, they are read out of the memory and stored into the respective registers. Then, similarly with the copying operation for copying the second original holding surface section Y in the UNFOLDING COPY MODE, "SCAN Y" is implemented from the step S65 in FIG. 8 based on the scan data Y1, Y2 and Y3 so that the copying operation is carried out only for the second original holding surface section Y.

On the other hand, the transporting operation of the copy sheet 17 is carried out in the following manner. At the step S10 of FIG. 6 following the step S9 of FIG. 6, it is checked as to whether it is the RIGHT-HALF MODE or not, and since the present mode is, in fact, the RIGHT-HALF MODE, the subsequent operation follows in the manner similar to the one in the case of the NORMAL COPY MODE. In this manner, even in the case when only a half of the surface of the original 2 is to be copied, the original 2 may be placed on the contact glass 1 with its one side in abutment against the vertical reference plate 85 just like any other mode. Thus, there is no need to change the manner of placing the original 2 on the contact glass 1 depending on which part of the original is to be copied.

BOTH-SIDED COPY MODE

This is a copy mode in which, without splitting the original surface into the first and second surface sections X and Y as shown in FIG. 2, original images are copied on both sides of a single copy sheet 17; on the other hand, the UNFOLDING BOTH-SIDED COPY MODE, which will be described later, is a copy mode in which the original document 2, sheet type or book type, is split into two sections X and Y, which are sequentially scanned in two separate operations, thereby having the two sections copied onto both sides of a single copy sheet 7. It should thus be understood that the latter copy mode is directly related to the present invention.

The BOTH-SIDED COPY MODE is selected by the depression of a both-sided key switch 61 in the input key section shown in FIG. 5. The operation of the optical system and the sequence of steps from the step where a copy sheet 17 having thereon a transferred toner image leaves the fixing device 24 to the step where the copy sheet 17 is transported by the transport rollers 25, 50 and 51 in this mode of operation is the same as in the case of the before-described NORMAL COPY MODE. Thus, it will be described as to the operation carried out to the copy sheet 17 subsequent to the step when the second sheet sensor 42 has been turned on by the copy sheet 17 on one surface or front surface of which a copy image has been formed. It is to be noted that for the convenience of description, the sequence of steps from the time when a copy image has been formed on the front surface of the copy sheet 17 to the time when the copy sheet 17 is supplied to a later-described intermediate tray will be referred to as a both-sided first surface copy mode, and the sequence of steps from the time when another copy image has been formed on the rear side of the copy sheet 17 to the time when the copy sheet 17 is discharged out of the apparatus will be referred to as the both-sided second surface copy mode.

Figure 7:
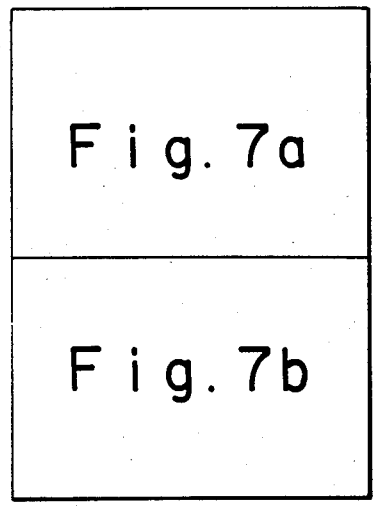
Figure 7A:
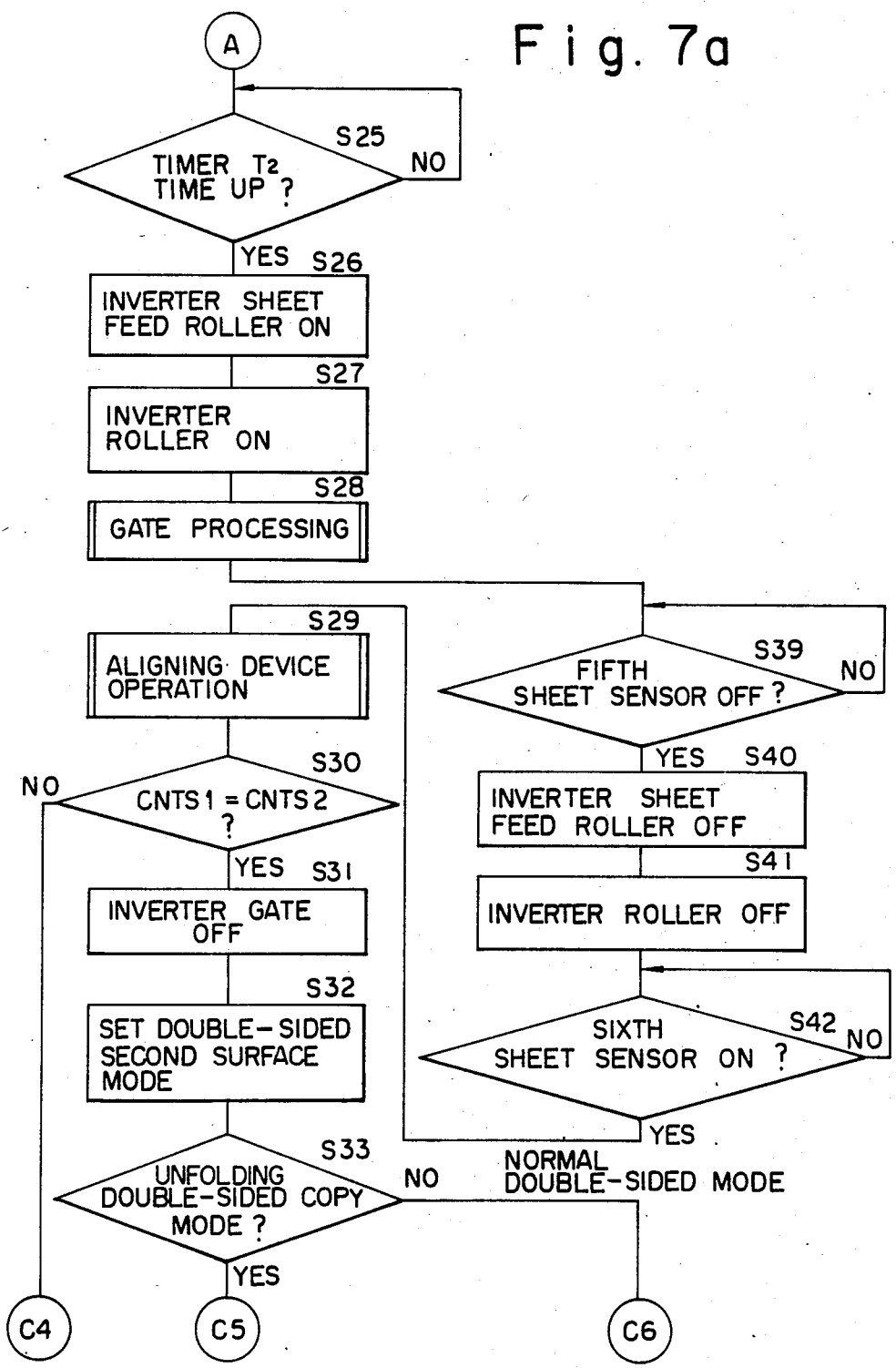
Figure 7B:
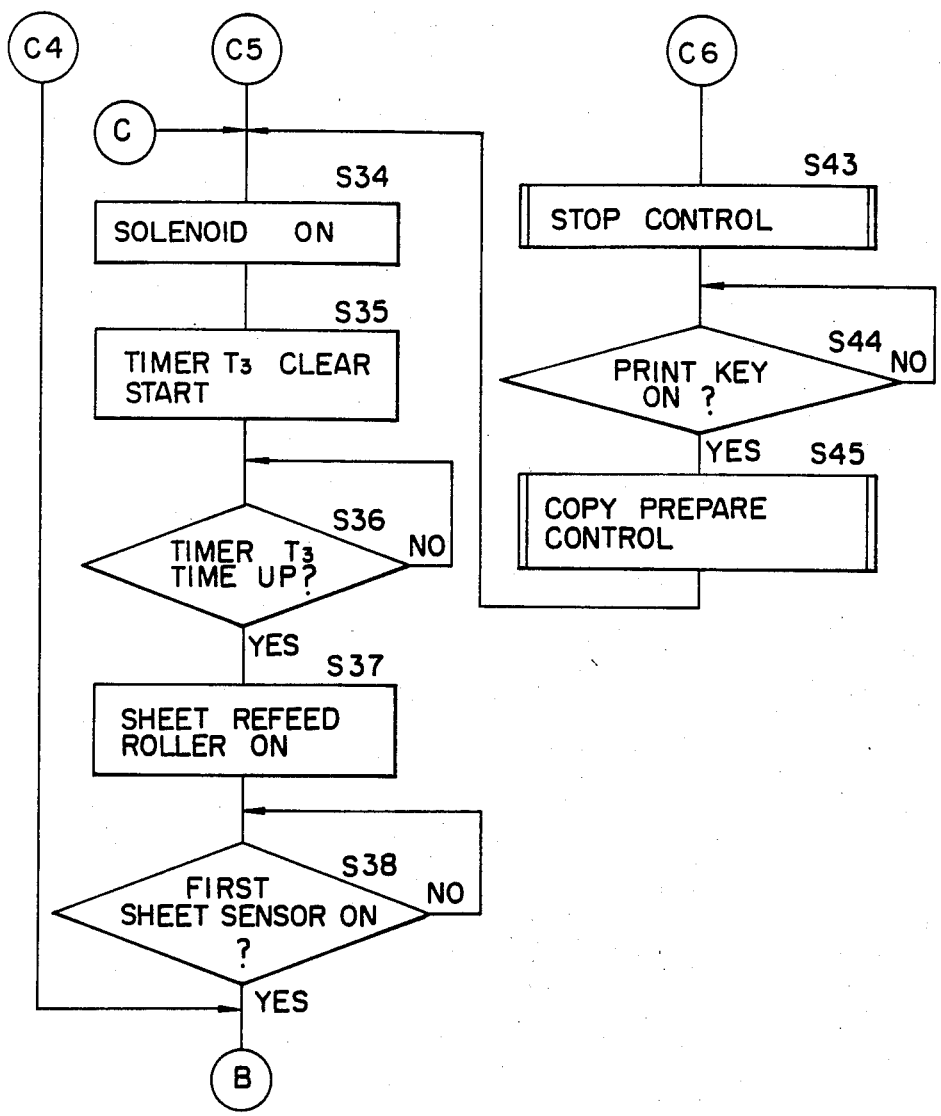

When the second sheet sensor 42 is turned on by the leading edge of the copy sheet 17 (FIG. 6, S8), it is checked first as to whether it is the NORMAL COPY MODE or not, then as to whether it is the RIGHT-HALF COPY MODE or not, and then as to whether it is the BOTH-SIDED SECOND COPY MODE or not (FIG. 6, S9, S10 and S11). Since the present copy mode selected is none of these modes, the first inversion gate 49 is turned on (FIG. 6, S12) so that this gate 49 pivots to the position indicated by the dotted line. At this time, since the second inversion gate 54 takes the off position indicated by the solid line, the copy sheet 17 is transported in the direction indicated by the arrow V (FIG. 2) so as to be fed into the path defined by the inversion guide plate 55. Then, when the trailing edge of the copy sheet 17 turns the fourth sensor 56 off (FIG. 6, S15), the timers T1, T2 are cleared and started (FIG. 6, S14). Then, it is checked as to whether it is the UNFOLDING ONE-SIDED COPY MODE or not (FIG. 6, S15), and when the trailing edge of the copy sheet 17 has reached the position in front of an inversion sheet feed roller 63 disposed in front of the second inversion gate 54, the timer T2 times up (FIG. 7, S25) so that the inversion sheet feed roller 63, which has so far been located away from the sheet travelling path, is rotated in the direction indicated by the arrow to drop on the copy sheet 17 (inversion sheet feed roller on; FIG. 7, S26), whereby two inversion rollers 57 are brought closer together to thereby have the copy sheet 17 sandwiched therebetween as being in contact therewith (inversion roller on; FIG. 7, S27) and thus the copy sheet 17 starts to be transported in the direction opposite to the direction of the arrow V. As a result, the copy sheet 17 is transported to an intermediate tray 65 through a gate device 64 by means of the transport rollers 51, 63a and the copy sheet 17 comes to a halt when its leading edge comes into abutment against a stopper 66 which is provided at the forward end of the intermediate tray 65. In this case, if the copy sheet 17 is simply fed into the intermediate tray 65 only by the transport rollers 51, 63a, the leading edge of the copy sheet 17 will reach the stopper 66 if the copy sheet 17 is relatively long, but there is a chance that the copy sheet 17 does not come into abutment against the stopper 66 if it is too short. In order to eliminate such a disadvantage, there is provided the gate device 64. In the illustrated embodiment, the gate device 64 includes a plurality (or three in the illustrated embodiment) of first, second and third gates 67, 68 and 69, which are disposed side by side as shown in FIG. 2. These gates 67, 68 and 69 are pivotally supported at pivots 70, 71 and 72, respectively. Opposite to these gates and wound around a pair of rollers 73 and 74 is a guide belt 75 which is driven to advance in the direction indicated by the arrow E. Also provided are transport rollers 76 and 77 which are paired with the rollers 73 and 74, respectively, and two additional pairs of rollers 78 and If the copy sheet 17 is long, the first gate 67 is pivoted to the position indicated by the solid line thereby guiding the copy sheet 17 to proceed into the intermediate tray 65 as indicated by the arrow F. If the copy sheet 17 is more longer, the second gate 68 in place of the first gate 67 is pivoted to the position indicated by the solid line so that the copy sheet 17 transported by the guide belt 75 and the roller 78 is guided to proceed in the manner indicated by the arrow G. Similarly, if the copy sheet 17 is still more longer, the copy sheet 17 is guided to proceed by the third gate 69 as indicated by the arrow H. Moreover, the copy sheet 17 may also be guided to proceed as passing between the rollers 74 and 77 as indicated by the arrow I. In this manner, it is insured that the leading edge of the copy sheet 17 comes into abutment against the stopper when it comes to a halt irrespective of the length of the copy sheet 17.

As described above, each gate of the gate device 64 is processed (FIG. 7, S28), and then when a fifth sheet sensor 80 disposed downstream of the transport rollers 51, 63a is turned off by the trailing edge of the copy sheet 17 (FIG. 7, S39), the inversion sheet feed roller 63 is lifted (roller 63 off; FIG. 7, S40) so that the two inversion rollers 57 are turned off and thus moved separated from each other (FIG. 7, S41).

On the other hand, when the copy sheet 17 is supplied into the intermediate tray 65, a sixth sheet sensor 81 disposed above the tray 65 is turned on by the copy sheet 17 (FIG. 7, S42), and because of this, a copy sheet arranging device, which is not shown but well known for one skilled in the art, is operated (FIG. 7, S29) thereby having the copy sheet 17 set in position in the intermediate tray 65. Then, the copy sheet 17 comes to a halt through engagement between its leading edge and the stopper 66, at which time since the copy sheet 17 has been turned upside down or inverted by the inversion guide plate 55, the front surface on which a copy image has been formed facing upward.

The above-described operation is repeated over a predetermined number of times CNTS1 (FIG. 7, S30) and thus a predetermined number of copy sheets 17 are stacked one on top of another in the intermediate tray 65, and, thereafter, the first inversion gate 49 is brought to the position indicated by the solid line (FIG. 7, S31), whereby the BOTH-SIDED SECOND SURFACE MODE to be carried out next is set (FIG. 7, S32), and, since it is not the UNFOLDING BOTH-SIDED COPY MODE (FIG. 7, S33), the termination or stop control routine (FIG. 7, S43) is carried out. This is the sequence of steps in the

BOTH-SIDED FIRST SURFACE MODE

Replacing the original document 2 on the contact glass 1 as desired, when the print key switch 37 is again depressed (FIG. 7, S44), the copy preparatory control routine (FIG. 7, S45) is implemented, and, thereafter, a solenoid (not shown) for the stopper 66 is energized (FIG. 7, S34) so that the stopper 66 is moved to its retracted position as indicated by the one-dotted line in FIG. 2. Then, the timer T3 is cleared and started (FIG. 7, S35), and when the timer T3 times up (FIG. 7, S39), a re-feed roller 82 disposed above the intermediate tray 65 is turned on so that this roller 82 starts to rotate (FIG. 7, S37). Thus, the copy sheet 17 is transported from the intermediate tray 65 in the direction indicated by the arrow J and, when the leading edge of the copy sheet 17 comes closer to the registration roller 19 and has the first sheet sensor 38 turned on (FIG. 7, S38), the copy sheet 17 comes to a temporary halt and it remains motionless there until the next registration start signal is generated. Also in this case, the optical system 5 operates in the NORMAL COPY MODE described before, and when the registration start signal is generated (FIG. 6, S6), the registration roller starts to rotate (FIG. 6, S7) so that the copy sheet 17 is again supplied toward the photosensitive drum 11 where another toner image is transferred from the drum 11 to the rear side of the copy sheet 17. This copy sheet 17 then moves past the fixing device 24, and after it moves past the second sheet sensor 42 (FIG. 6, S8), it is checked as to whether it is the NORMAL COPY MODE or not (FIG. 6, S9), then as to whether it is the RIGHT-HALF COPY MODE or not (Fig.6, S10), and as to whether it is the BOTH-SIDED SECOND SURFACE MODE or not (FIG. 6, S11). And, since the present copy mode is the BOTH-SIDED SECOND SURFACE MODE, similarly with the NORMAL COPY MODE, without passing through the inversion guide plate 55 and the intermediate tray 65, it is transported as guided by the guide plates 43 and 44 to move past the third sheet sensor 46 (FIG. 6, S20) and finally onto the tray 26 exterior of the copying machine. After repetition of the same operations over a predetermined number of repetitions, the termination control routine is carried out (FIG. 6, S23 and S24).

UNFOLDING BOTH-SIDED COPY MODE

This copy mode is selected by the depression of both of the UNFOLDING key switch 47 and the BOTH-SIDED key switch 61 in the input key section shown in FIG. 5. The operation of the light source 3 and the scanner 13 in the optical system 5 is the same as that of the UNFOLDING ONE-SIDED COPY MODE.

Thus, also in this case, the light source 3 starts its operation from the home position for the illumination of the first original holding surface section X and also for the illumination of the second original holding surface section Y. The movement of the copy sheet 17 is substantially the same as that in the case of the BOTH-SIDED COPY MODE, but it differs only on the point that when moving into the BOTH-SIDED SECOND SURFACE COPY MODE upon completion of the BOTH-SIDED FIRST SURFACE COPY MODE, there is no need to depress the print key switch 37 (FIG. 7, S33–S34). In the UNFOLDING BOTH-SIDED COPY MODE, since the first original holding surface section X and the second original holding surface section Y of the same original 2 placed on the contact glass 1 are copied onto the front and rear surfaces of the same copy sheet 17, the original document 2 does not need to be changed upon completion of either one of the first and second sections X and Y. Thus, without depression of the print key switch 37 for the second time, the other of the first and second sections X and Y is automatically copied onto the second surface of the same copy sheet 17 in succession.

Figure 16:
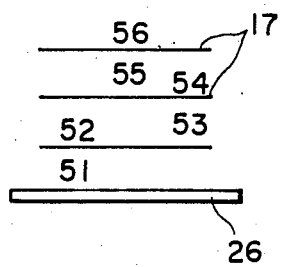

Also in either of the ordinary BOTH-SIDED COPY MODE and the UNFOLDING BOTH-SIDED COPY MODE, as is apparent from the above description, the order of pages of processed copy sheets 17 can be arranged in the same order of the pages of the original 2 copied. FIG. 16 shows an example how the copy sheets 17 processed in these copy modes are stored in the tray 26 as stacked, and the numerals placed near the associated copy sheets 17 indicates the page numbers of the original 2 copied.

It is also to be noted that small shaded rectangles shown located above some of the key switches in the key input section illustrated in FIG. 5 are indicator lamps which are lit when the associated key switches are depressed, and they are preferably comprised of light-emitting diodes and they indicate to the operator to the fact that the associated key switches are in the on state.

In the above-described embodiment, it is so structured that, during the RIGHT-HALF COPY MODE, the copy sheet 17 is transported in the manner exactly the same as done in the NORMAL COPY MODE to be finally discharged, whereby the original image in the second original holding surface section Y is copied only on one side of the copy sheet 17. However, with the depression of both of the RIGHT-HALF key switch 101 and the BOTH-SIDED key switch 61, similarly with the normal BOTH-SIDED COPY MODE, it may also be so structured that the copy sheet 17 having its one side processed to bear thereon a copy image of the original in the second original holding surface section Y is transported to the intermediate tray 65, and, then, the same copy sheet 17 is used again to form another copy image of the same or different original 2 on the other side thereof, which is followed by the step of having the copy sheet 17 having copy images on both sides thereof discharged out of the apparatus. The movement of the copy sheet 17 in this case is self-evident from FIGS. 6 and 7 and the previous explanation, and, thus, it is not illustrated. In this manner, if it is so structured that either the one-sided copy mode or the both-sided copy mode is selected even in the RIGHT-HALF COPY MODE, the convenience is greatly increased.

The detailed description for each of the various copy modes which can be implemented by the copy apparatus constructed in accordance with the present invention have been described in detail. However, in the illustrated copying apparatus, in order to make it easy the operation of placing the original document 2 on the contact glass 1, the contact glass is so structured to indicate the position where the original document 2 is to be placed facing downward, and, thus, this aspect of the present invention will now be described below.

Figure 17:
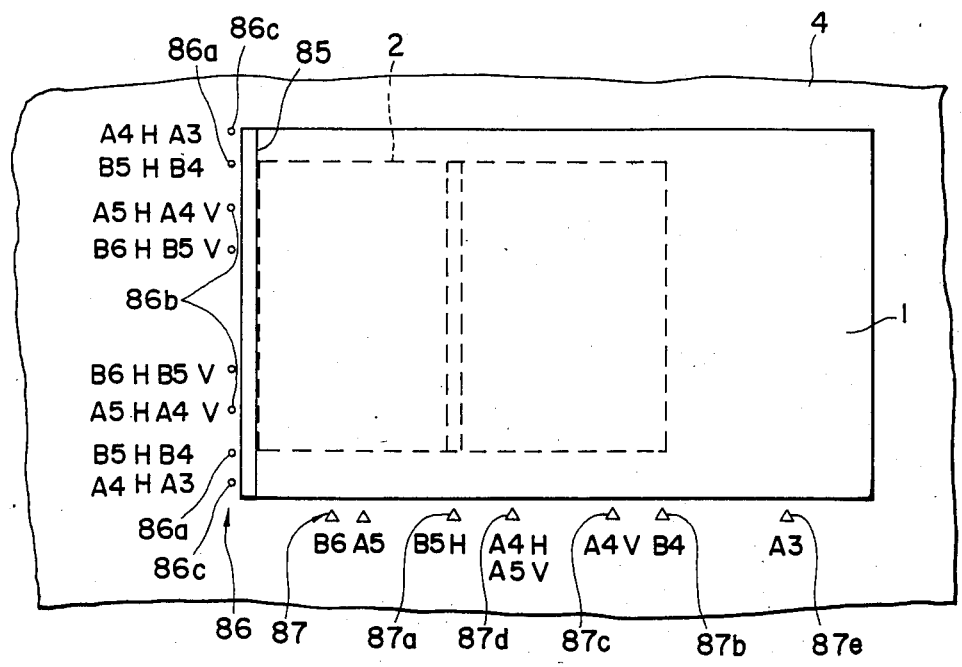
FIG. 17 is an illustration showing the contact glass 1 and a plurality of indicator lamps disposed around the contact glass 1.

FIG. 17 is a plan view of the copying apparatus when looked from above, and it shows how the contact glass 1 is fixedly mounted on top of the housing 4. At the left-hand side of the contact glass 1 is disposed the vertical reference plate 85 which is used for positioning the original document 2 on the contact glass 1 in the left and right direction. That is, when the original document 2 is to be placed on the contact glass 1 facing downward, the left-hand side of the original document 2 should be brought into abutment against the vertical reference plate 85 so that the original document 2, in effect, is placed on the contact glass 1 as indicated by the dotted line in FIG. 17. Also provided in the housing 4 near the contact glass 1 are a plurality of indicator lamps 86 arranged along the vertical reference plate 85 and another plurality of indicator lamps 87 are arranged along the bottom edge of the contact glass 1.

On the other hand, as already having been described, the length and width, or the entire size of the copy sheet 17 is detected by the length detector 30 (FIGS. 3 and 4), and based on the information thus detected, the lamps 86 and 87 are selectively lit. For example, it will be considered the case in which a copy is to be made with unity magnification from a book original which has the B4 size when unfolded or opened and each page of which has the B5 size under the UNFOLDING (ONE-SIDED or BOTH-SIDED) COPY MODE. In this case, use is normally made of copy sheets 17 having the B5 size. When the size of the copy sheets 17 to be used is detected and the UNFOLDING key switch 47 shown in FIG. 5 is depressed, among the indicator lamps 86 in the widthwise direction, two lamps 86a having the indication of "B5 H" are lit, and, yet, among the other set of indicator lamps 87, two lamps 87a and 87b having the indications of "B5 H" and "B4", respectively, are lit. Under the circumstances, the operator can easily place the book original 2 on the contact glass 1 facing downward with its widthwise direction in alignment with the two lit lamp 86a and its lengthwise direction in alignment with the lit lamp 87b as indicated by the dotted line in FIG. 17. In this case, since the other lamp 87a in the horizontal array along the bottom edge of the contact glass 1 is also lit, the operator can confirm that the book original 2 is going to be scanned in a slit mode between the first and second original holding surface sections X and Y one after another in sequence.

In the case where the copying operation is to be carried out in the mode other than the UNFOLDING COPY MODE, for example, when the original document 2 of the B5 size is to be copied onto the copy sheet 17 of the B5 size in the unity magnification mode, it is so structured that only the above-described two lamps 86a and the other lamp 87a are lit, thereby indicating to the operator where to place the original document 2 of the B5 size to be copied on the contact glass 1.

Figure 18:
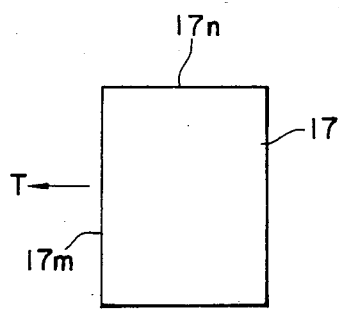
FIGS. 18 and 19 are schematic illustrations showing two orientations of a copy sheet set in the copying apparatus.
Figure 19:
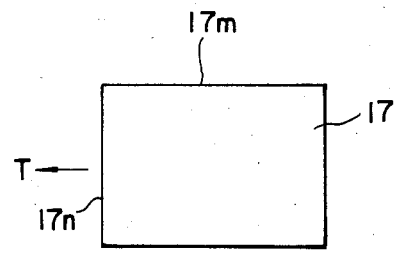

In the above-described two examples, it is assumed that, as shown in FIG. 18, the copy sheet 17 is oriented horizontally, i.e., its longer side 17m being perpendicular to the direction of advancement T of the copy sheet 17 and its shorter side 17n being in parallel with the advancing direction T, when the copy sheet 17 is transported through a predetermined path defined in the copying apparatus. On the other hand, in the case where the copy sheet 17 is to be transported in vertical orientation as shown in FIG. 19, one or more of those indicator lamps associated with this particular orientation will be lit. For example, in the case where the original document of the A4 size is to be copied onto the copy sheet 17 of the A4 size in the vertical orientation with unit magnification in the NORMAL COPY MODE, then two lamps 86b corresponding to "A4 V" in the vertical indicator lamp array and the single lamp 87c corresponding to "A4 V" are lit so that the original document 2 can be conveniently placed on the contact glass 1 as guided by the appropriately lit lamps. On the other hand, in the case where the original document 2 of A4 size is to be copied onto the copy sheet of A4 size in the horizontal orientation with unity magnification in the NORMAL COPY MODE, the two lamps 86c in the vertical lamp array corresponding to "A4 H" and the single lamp 87d in the horizontal lamp array corresponding to "A4 H" are lit. In this manner, the indicator lamps 86 and 87 are selectively lit depending on the size of the copy sheet 17 used and the orientation of the copy sheet 17, i.e., horizontal or vertical, with respect to the direction of advancement, so that the operator can easily place the original document 2 on the contact glass 1 using the lit lamps 86 and 87 as a guide.

In addition, when the magnification ratio is selected to be other than unity, the indicator lamps 86 and 87 are also selectively lit corresponding to the selected magnification ratio. For example, in the case when a selection is made to make a copy from the original document 2 onto the copy sheet 17 of B5 size in the horizontal orientation with the magnification ratio of 0.865 in the UNFOLDING COPY MODE, two lamps 86c in the vertical lamp array corresponding to "A4 H" and the single lamp 87d in the horizontal lamp array corresponding to "A4 H" are lit, and, at the same time, the other lamp 87e corresponding to "A3" is also lit.

The contact glass 1 is limited in size and those originals larger in size than the contact glass 1 cannot be copied as a whole in one copying operation. In the case of the contact glass 1 shown in FIG. 17, originals 2 up to A3 size (position of lamp 87e) can be copied in its entirety in one copying operation, but the originals 2 larger than this size cannot be copied in its entirety in a single copying operation. Thus, if it is desired to make a copy on the copy sheet 17 of A4 size in the horizontal orientation with the magnification ratio of 0.5 in the UNFOLDING COPY MODE, the corresponding size of the original document 2 is A3 size and this A3 size original document 2 must be placed on the contact glass 1 facing downward in the horizontal direction; however, if such original document 2 is placed on the contact glass 1 in this manner, the original document 2 will extend beyond the top and bottom sides of the contact glass 1 of FIG. 17 so that these extended portions of the original document 2 will fail to be reproduced on the same copy sheet 17. Under the circumstances, when such an incomplete copying condition is selected, a warning lamp 88 provided, for example, in the input key section 36 shown in FIG. 5 for indicating this fact is lit and/or a buzzer provided in the copying apparatus is activated to indicate to the operator that the incomplete copying condition has been selected.

As described above, original documents 2 up to the A3 size may be copied in its entirety by the copying apparatus provided with the contact glass 1 shown in FIG. 17. Typically, the operator using the copying apparatus would select the size of the copy sheet 17 to be used in consideration of the size of the original document 2 and the magnification ratio and to make a copy on the selected copy sheet 17. However, in some cases, through an error or because there is no properly sized-copy sheet 17 at hand, it may be that use is made of the copy sheet 17 which is larger in size than the copy image produced. For example, in the case where copies are to be made from the book original 2 which has A4-sized pages and thus has the A3 size when opened or unfolded with the unity magnification ratio in the UNFOLDING COPY MODE, use is normally made of the copy sheets 17 having the A4 size as set in the horizontal orientation in the copying apparatus. However, due to some reason as set forth above, it is conceivable that the copy sheet 17 larger in size than A4, such as A3 size, are set and selected for use. In such a case, the length of thus selected copy sheets 17 is detected by the previously described length detector 30 and this information is transferred to the accumulator Acc (FIG. 8, S54), which is followed by the steps of calculating the scan data from this information (FIG. 8, S55) and calculating the scanning distance traversed by the light source 3 and the scanner 13. If this happens, the light source 3 will be travelled over the distance which is twice the distance inherently required to scan the first and second original holding surface sections X and Y, so that the original document 2 cannot be copied onto the copy sheet 17 properly in the UNFOLDING COPY MODE.

Figure 20:
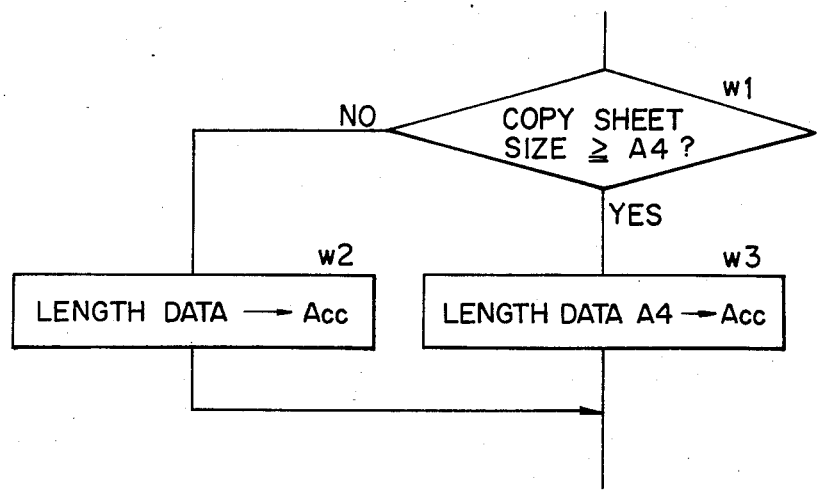
FIG. 20 is a flow chart showing a modification of the embodiment shown in FIG. 8.

Under the circumstances, if there is a danger that such inconveniences will occur, it is advantageous if the sequence of control operation enclosed by the dotted line in FIG. 8 is substituted by an alternative example shown in FIG. 20. In the example shown in FIG. 20, when the UNFOLDING COPY MODE has been selected, it is checked as to whether the size of the copy sheets 17 set is A4 size or larger (FIG. 20, w1), and if this is smaller than the A4 size, similarly with the case of FIG. 8, its length data is transferred to the accumulator Acc (FIG. 20, w2) and, based on that, the scan data is calculated. On the other hand, if the size of the copy sheet 17 set is A4 size or larger, the size of the copy sheet 17 is forcibly set at A4 size, and this information is transferred to the accumulator Acc (FIG. 20, w3) and then, based on this information, the scan data are calculated. If so structured, the original images in the first and second original holding surface sections X and Y can be properly copied on the copy sheet 17 whose size is A4 or larger. In this case, there may be produced a relatively large white margin on the copy sheet 17 of A4 or larger in size, but all of the original images are copied on the copy sheet 17 so that original image information is not lost. It is to be noted that, also in the example shown in FIG. 20, the scanning distance traversed by the light source 3 for illuminating each of the first and second original holding surface sections X and Y is set depending on the length of the copy sheet 17 as described previously with regard to other embodiments.

Figure 21:
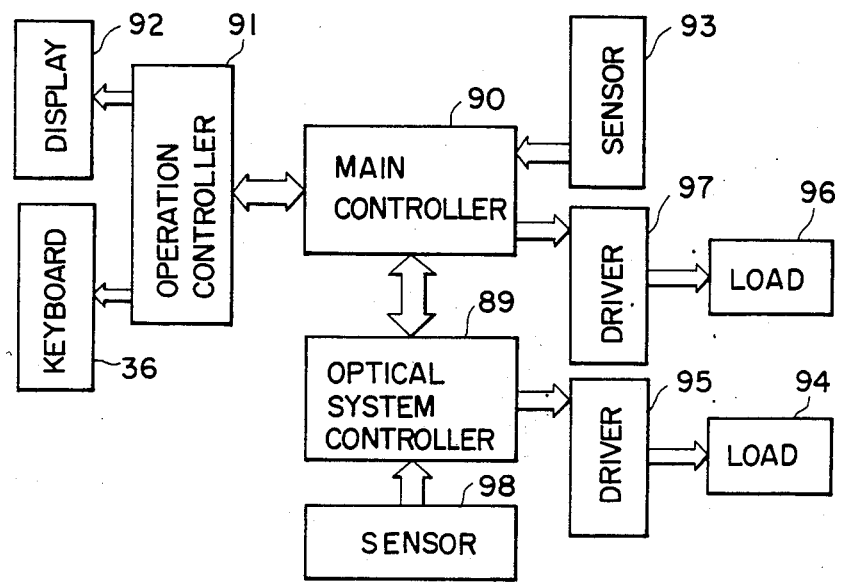
FIG. 21 is a block diagram showing the relation among control sections in the copying apparatus shown in FIG. 2.

FIG. 21 is a functional block diagram which shows in a simplied format various control units required to carry out various control operations. The system shown in FIG. 21 includes an optical system control unit 89 which takes care of the control operation of the optical system shown in FIGS. 8 and 9. It is to be noted that this optical system control unit 89 is also in charge of conversion of magnification ratio. The system shown in FIG. 21 also includes a main controller 90 which takes care of various control operations shown in FIGS. 6 and 7 and main control operations of the copying apparatus other than those associated with the optical system, and the main controller 90 also serves as an interface between an operation controller 91 and the optical system control unit 89. The operation controller 91 is in charge of the control operations for controlling a display device 92, including those indicator lamps or the like shown in FIGS. 5 and 17, and for controlling the key input section 36. The communication between the main controller 90 and the optical system control unit 89 is carried out during a judgement routine, for example, from the time when the copy sheet 17 has been fed toward the registration roller 19 from the cassette 16 as shown in FIG. 17 to the time when the first sheet sensor 38 is turned on. In addition, the system of FIG. 21 also includes a sensor 93 which is an aggregate of those sensors, such as first through sixth sheet sensors 38, 42, 46, 56, 80 and 81, and the signals from these sensors are inputted into the main controller 90. Moreover, the system of FIG. 21 also includes another sensor 98 which is an aggregate of those sensors, such as the home position switch 40 which is operated every time when the light source 3 and the scanner 13 start to move from the home position and return thereto, and the length detector 30 for detecting the length of the copy sheet 17 set in the copying apparatus. The signals from these sensors are inputted into the optical system control unit 89. Still further, the system of FIG. 21 also includes a load which is typically the scanner 13 of the optical system 5 and which receives an output from the optical system control unit 89 through an associated driver 95. Similarly, also provided in the system of FIG. 21 is another load 96 which comprises various other elements of the copying apparatus shown in FIG. 2 than the optical system, such as photosensitive drum 11 and developing device 14, and which receives an output from the main controller 90 through an associated driver 97.

In the above-described embodiments, the illumination or scanning of each of the first and second original holding surface sections X and Y, i.e., the length or time required for irradiating light effective in illuminating these sections is controlled by the on/off control of the eraser 29 and the light source 3 which determines the position of the leading edge of an electrostatic latent image formed on the photosensitive drum 11 and the scanning control which switches from the forward movement to the return movement of the original illumination scanning means, and this control is carried out in association with the sheet feed timing control for feeding the copy sheet 17 toward the photosensitive drum 11; however, it is to be noted that the present invention should not be limited only to such a structure and various other modes are also applicable. For example, the present invention may also be applied to a copying apparatus having a fixed magnification ratio, and, furthermore, the present invention may also be applied when making copies from a sheet type original document in place of a book type original document.

As described above, in accordance with the present invention, it does not require the provision of any special detecting means for detecting the size of an original document and splitting the surface of the original document into two half sections, and there is provided a copying apparatus simplified in operation and high in accuracy in splitting an original surface into two half sections. In addition, the convenience in placing the original document on the contact glass facing downward is greatly enhanced and even if only one half of the original document is to be copied, it is not necessary to place the original document on the contact glass awkwardly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A copying apparatus comprising:
a housing;
holding means provided on said housing for holding thereon stationarily an original to be copied, said holding means having a first scanning range and a second scanning range in a side-by-side relation;
storing means for storing a quantitY of copy sheets;
detecting means for detecting the size of said copy sheets stored in said storing means, said detecting means detecting at least the length of said copy sheets;
transporting means for transporting said copy sheets one by one along at least partly a predetermined path defined in said housing;
imaging means disposed inside of said housing for forming a copy image on a copy sheet being transported by said transporting means, said imaging means including scanning means for scanning said original placed on said holding means;
input means for manually inputting at least one of a plurality of operational commands which can be carried out by said apparatus selectively; and
control means for controlling the operation of each of said transporting means and said imaging means in accordance with said at least one operational command input by said input means, said control means having means for determining a range of scanning movement of said scanning means for a predetermined reference position in registry with at least one of said first and second scanning ranges on said holding means selectively in accordance with the length of said copy sheets detected by said selecting means.

2. The copying apparatus of claim 1 wherein said control means includes a memory for storing first data indicating a first position separated away from said predetermined reference position by a first distance, second data indicating a second position separated away from said predetermined reference position by a second distance and third data indicating a third position separated away from said predetermined reference position by a third distance, wherein said first, second and third positions are determined from the information supplied by said detecting means and correspond in position to a left-hand side, center and a right-hand side of said original placed on said holding means, to thereby divide the surface of said original into a first original surface section, defined between said first and second positions and corresponding to said first scanning range, and a second original surface section, defined between said second and third positions and corresponding to said second scanning range.

3. The copying apparatus of claim 2 wherein said input means includes a first input switch for supplying a first command for making copies from both of said first and second original surface sections one after another in a predetermined sequence to said control means when depressed and a second input switch for supplying a second command for making at least one copy from one of said first and second original surface sections when depressed.

4. The copying apparatus of claim 3 wherein said scanning means initiates its scanning operation always from said predetermined reference position when a copy is to be made through depression of either of said first and second input switches.

5. The copying apparatus of claim 1 wherein said storing means includes a plurality of cassettes, each of which is detachably mounted in position in said housing, each of said plurality of cassettes capable of storing therein a quantity of copy sheets different in size and said detecting means is structured to detect the length of all of the copy sheets stored in said plurality of cassettes.

6. The copying apparatus of claim 1 wherein said imaging means includes a photosensitive drum rotatably supported by said housing and driven to rotate in a predetermined direction, said drum having a peripheral surface on which a copy image is to be formed, charging means for uniformly charging said peripheral surface, exposing means for exposing at least part of said original to said charged peripheral surface thereby forming an electrostatic latent image, developing means for developing said latent image thereby forming a toner image, and transferring means for transferring said toner image to said copy sheet while being transported by said transporting means.

7. The copying apparatus of claim 6 wherein said imaging means further comprises cleaning means for cleaning said peripheral surface after transfer of said toner image by said transferring means and first irradiation means for applying a first irradiation to said peripheral surface thereby removing residual charge from said peripheral surface after cleaning.

8. The copying apparatus of claim 7 wherein said imaging means further includes a second irradiation means disposed between said charging means and said exposing means for removing charge from a selected section of said peripheral surface through application of a second irradiation to said selected section.

9. The copying apparatus of claim 6 wherein said predetermined transporting path includes a first transporting path leading from said storing means to a transferring station where said transferring means for transporting said copy sheets one by one is disposed and a second transporting path leading from said transferring station to an output of said housing.

10. The copying apparatus of claim 9 wherein said predetermined transporting path further includes a return path connected to said second transporting path and a third transporting path extending from said second transporting path to said transferring station.

11. The copying apparatus of claim 1 further comprising indicating means mounted on said housing around said holding means, said indicating means indicating a location for placing said original on said holding means.

12. The copying apparatus of claim 11 wherein said holding means includes a contact glass rectangular in shape on which said original is placed facing downward and said indicating means includes a first plurality of lamps arranged in a vertical array along one vertical side of said contact glass and a second plurality of lamps arranged in a horizontal array along one horizontal side of said contact glass, wherein said first and second plurality of lamps are selectively lit by said control means so as to indicate to the operator where to place said original on said contact glass.

* * * * *